United States Patent
Hiramatsu

(10) Patent No.: US 12,142,937 B2
(45) Date of Patent: Nov. 12, 2024

(54) POWER TRANSMITTING APPARATUS, CONTROL METHOD FOR POWER TRANSMITTING APPARATUS, AND STORAGE MEDIUM

(71) Applicant: CANON KABUSHIKI KAISHA, Tokyo (JP)

(72) Inventor: Tomoki Hiramatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 18/064,200

(22) Filed: Dec. 9, 2022

(65) Prior Publication Data
US 2023/0104039 A1 Apr. 6, 2023

Related U.S. Application Data

(63) Continuation of application No. PCT/JP2021/014995, filed on Apr. 9, 2021.

(30) Foreign Application Priority Data

Jun. 26, 2020 (JP) .................................. 2020-110819

(51) Int. Cl.
*H02J 50/10* (2016.01)
*H02J 50/40* (2016.01)
*H02J 50/60* (2016.01)
*H02J 50/80* (2016.01)

(52) U.S. Cl.
CPC ............ *H02J 50/10* (2016.02); *H02J 50/402* (2020.01); *H02J 50/60* (2016.02); *H02J 50/80* (2016.02)

(58) Field of Classification Search
None
See application file for complete search history.

(56) References Cited

U.S. PATENT DOCUMENTS

| | | | |
|---|---|---|---|
| 10,014,708 B2 | 7/2018 | Inoue et al. | |
| 2015/0116296 A1* | 4/2015 | Greene | H02J 50/12 345/211 |
| 2016/0268815 A1* | 9/2016 | Lee | H02J 50/90 |
| 2017/0033609 A1 | 2/2017 | Nakamura | |
| 2017/0093214 A1 | 3/2017 | Watanabe et al. | |
| 2017/0170686 A1 | 6/2017 | Van Wageningen et al. | |

(Continued)

FOREIGN PATENT DOCUMENTS

| | | | |
|---|---|---|---|
| JP | 2015-056959 A | 3/2015 |
| JP | 2015-211536 A | 11/2015 |

(Continued)

*Primary Examiner* — Jared Fureman
*Assistant Examiner* — Aqeel H Bukhari
(74) *Attorney, Agent, or Firm* — Canon U.S.A., Inc. IP Division

(57) ABSTRACT

A power transmitting apparatus (100) derives data corresponding to a reference for power loss between the power transmitting apparatus (100) and a power receiving apparatus (200) on a basis of a value of reception power received from the power receiving apparatus; and performs a foreign object detection based on the data corresponding to the reference for power loss. The power transmitting apparatus (100) re-derives the data corresponding to the reference for power loss, when a change in the power transmission and reception state is detected in a power-transmittal range of the power transmitting apparatus (100).

13 Claims, 16 Drawing Sheets

(56) References Cited

U.S. PATENT DOCUMENTS

| | | | |
|---|---|---|---|
| 2017/0294797 A1 | 10/2017 | Meng et al. | |
| 2018/0342905 A1 | 11/2018 | Fukaya et al. | |
| 2019/0237992 A1 | 8/2019 | Miwa et al. | |
| 2020/0169121 A1 | 5/2020 | Keith et al. | |
| 2020/0328616 A1 | 10/2020 | Van Wageningen et al. | |
| 2020/0366137 A1 | 11/2020 | Park et al. | |
| 2021/0036555 A1 | 2/2021 | Park | |
| 2021/0210984 A1* | 7/2021 | Peralta | H02J 50/80 |
| 2022/0352762 A1* | 11/2022 | Kovacs | H01F 27/366 |
| 2023/0108768 A1 | 4/2023 | Yongcheol | |

FOREIGN PATENT DOCUMENTS

| | | |
|---|---|---|
| JP | 2017-070074 A | 4/2017 |
| JP | 2017-529823 A | 10/2017 |
| JP | 2018-520630 A | 7/2018 |
| JP | 2019-515629 A | 6/2019 |
| JP | 2020-061939 A | 4/2020 |
| WO | 2015/037362 A1 | 3/2015 |
| WO | 2016/044025 A1 | 3/2016 |
| WO | 2017/012979 A1 | 1/2017 |
| WO | 2017/194338 A1 | 11/2017 |

* cited by examiner

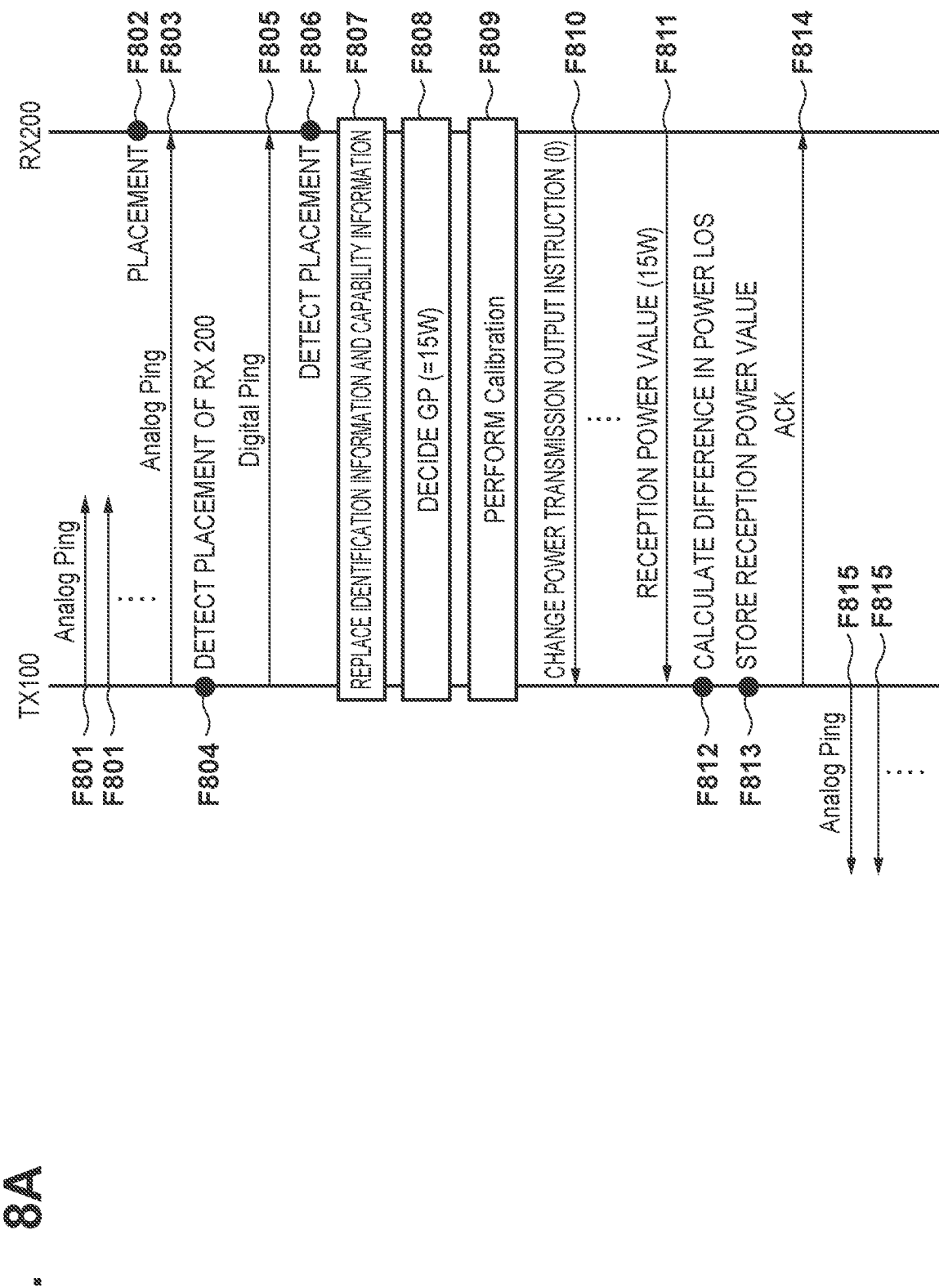

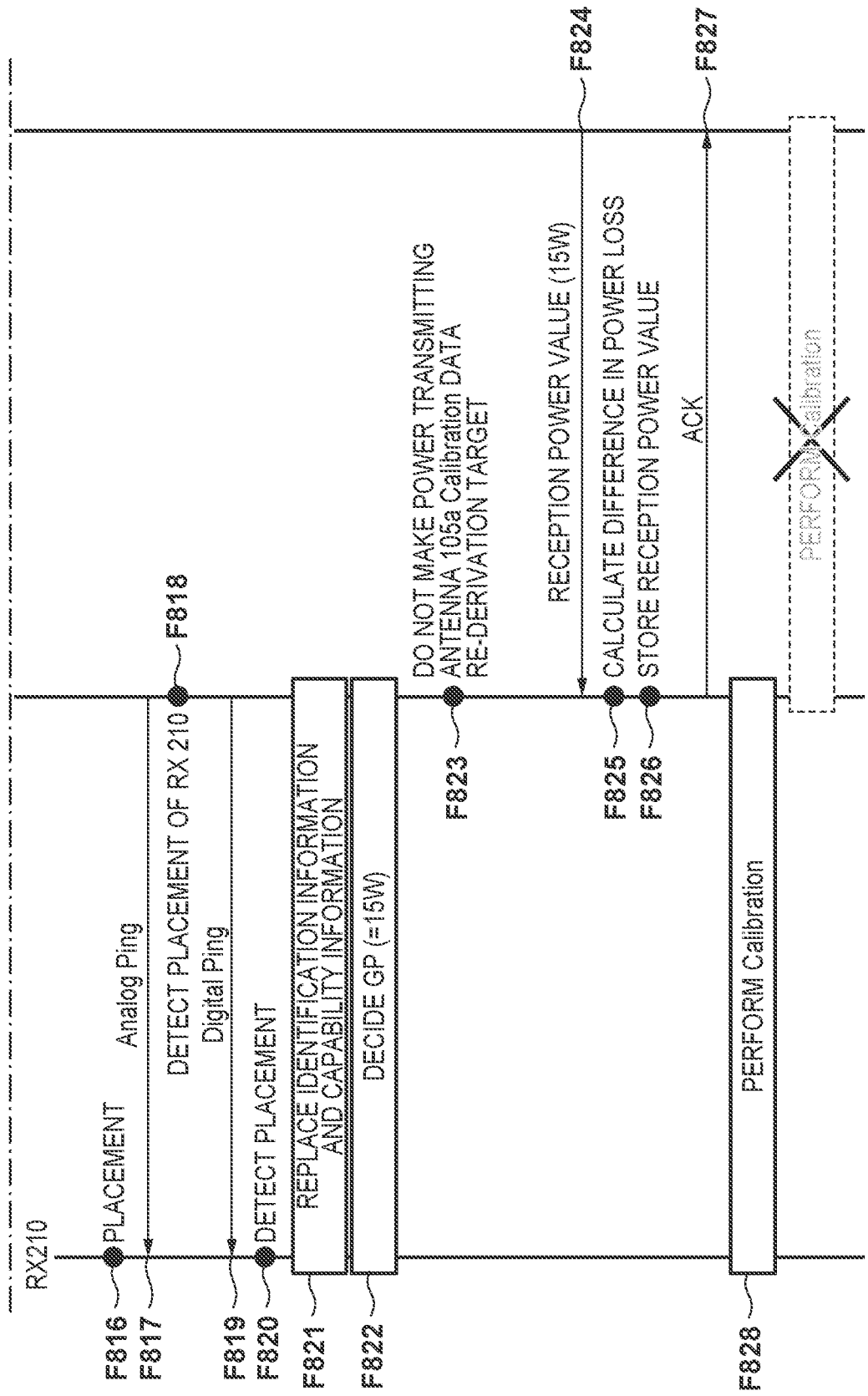

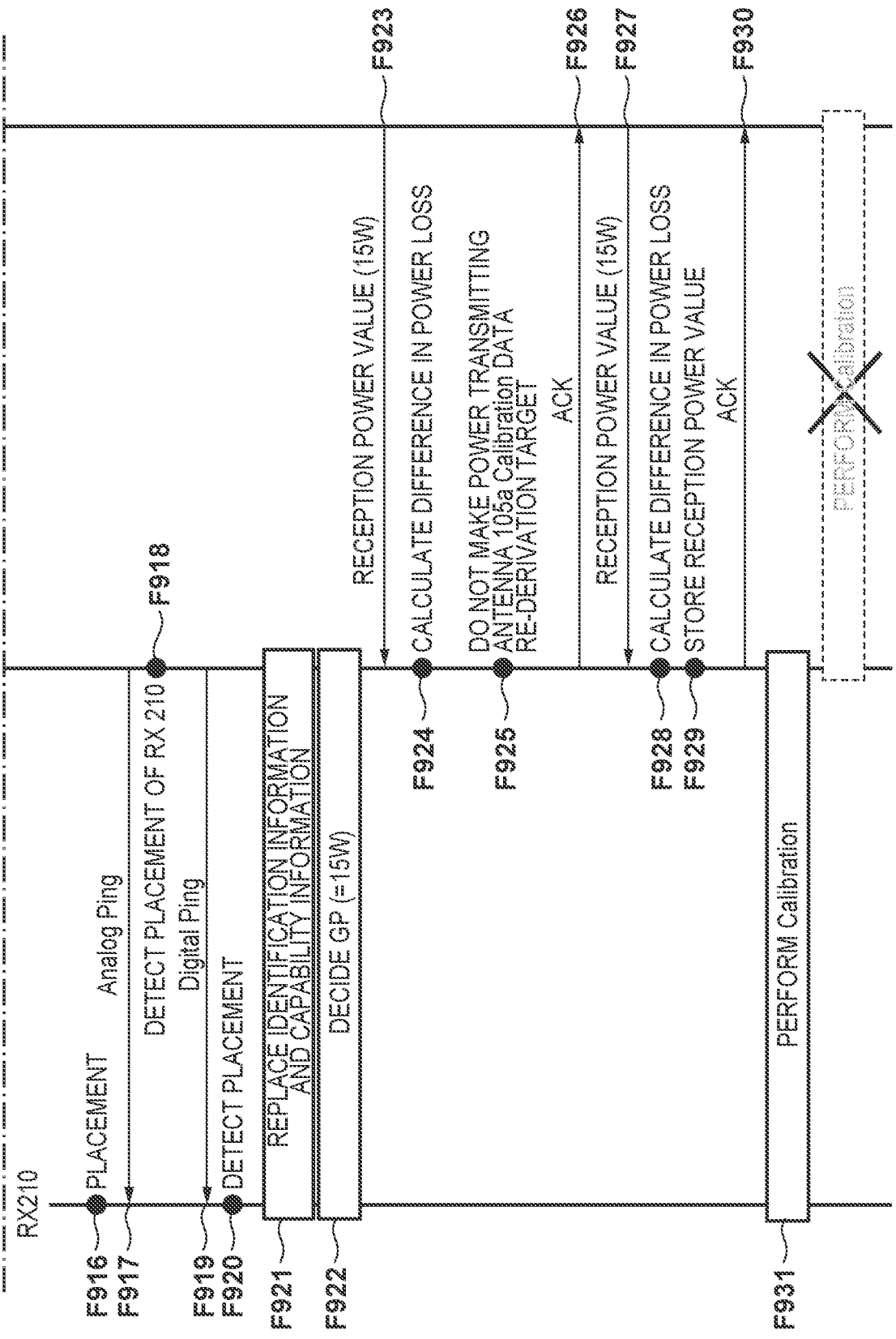

F I G. 10

| TARGET POWER TRANSMITTING ANTENNA | ADJACENT POWER TRANSMITTING ANTENNA |
|---|---|
| 105a | 105b |
| 105b | 105a, 105c |
| 105c | 105b |

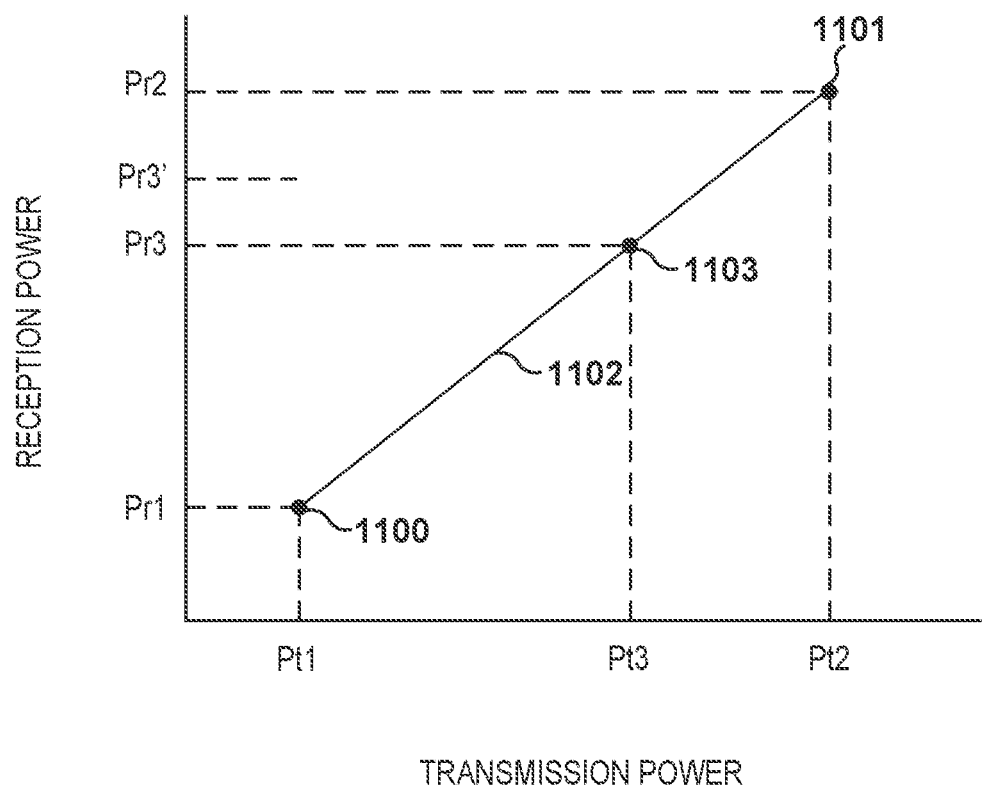

POWER TRANSMITTING APPARATUS, CONTROL METHOD FOR POWER TRANSMITTING APPARATUS, AND STORAGE MEDIUM

CROSS-REFERENCE TO RELATED APPLICATIONS

This application is a Continuation of International Patent Application No. PCT/JP2021/014995, filed Apr. 9, 2021, which claims the benefit of Japanese Patent Application No. 2020-110819, filed Jun. 26, 2020, both of which are hereby incorporated by reference herein in their entirety.

BACKGROUND

Field

The present disclosure relates to a wireless power transmission technique.

Background Art

Development of technology relating to wireless power transmission systems has been carried out extensively in recent years. A power transmitting apparatus and a power receiving apparatus compliant with a standard (the Wireless Power Consortium (WPC) standard) developed by the WPC, a group for promoting wireless charging standards, are described in PTL 1. Also, a method for foreign object detection relating to the WPC standard is described in PTL 2. Herein, a foreign object is an object with electrical conductivity such as a metal piece or the like. In the WPC standard, from the difference between the transmission power at a power transmitting apparatus and the reception power at a power receiving apparatus, the power loss in a state where there is no foreign object between the power transmitting apparatus and the power receiving apparatus is calculated in advance, and the calculated value is taken as the power loss in a normal state (state with no foreign object) during power transmission processing. Then, when the power loss between the power transmitting apparatus and the power receiving apparatus calculated during power transmission thereafter is separated from the power loss in a normal state, i.e., the reference, by a value equaling a threshold or greater, it is determined that there is a foreign object or that there is a possibility of a foreign object being there.

CITATION LIST

Patent Literature

PTL1: Japanese Patent Laid-Open No. 2015-056959
PTL2: Japanese Patent Laid-Open No. 2017-070074

With a power receiving apparatus capable of simultaneously transmitting power to a plurality of power receiving apparatuses, when a first power receiving apparatus and a second power receiving apparatus are placed on the power transmitting apparatus, there is a possibility that the power loss between the power transmitting apparatus and the first power receiving apparatus may be affected by the second power receiving apparatus. In a similar manner, there is a possibility that the power loss between the power transmitting apparatus and the second power receiving apparatus may be affected by the first power receiving apparatus. Accordingly, when there is a change in the state (number of apparatuses or the like) of the power receiving apparatuses placed on the power transmitting apparatus, a change also occurs in the power loss between the power transmitting apparatus and the power receiving apparatus in a normal state calculated in advance. This also may reduce the foreign object detection accuracy.

SUMMARY

In light of the problems described above, the present disclosure provides a technique for appropriately transmitting power from a power transmitting apparatus to a power receiving apparatus.

To solve the problem described above, a power transmitting apparatus according to the present disclosure has the following configuration. That is, according to one aspect of the present disclosure, there is provided a power transmitting apparatus comprising:
 a power transmitting unit configured to transmit power wirelessly to one or more power receiving apparatuses;
 a communicating unit configured to communicate with the one or more power receiving apparatuses;
 a deriving unit configured to derive data corresponding to a reference for power loss between the power transmitting apparatus and a power receiving apparatus on a basis of a value of reception power received from the power receiving apparatus via the communicating unit;
 a foreign object detecting unit configured to detect an object different from the power receiving apparatus performing communication on a basis of the data corresponding to the reference for power loss; and
 a detecting unit configured to detect a change in a power transmission and reception state in a power-transmittal range of the power transmitting apparatus, wherein
 when a change in the power transmission and reception state is detected by the detecting unit during power transmission by the power transmitting unit to the power receiving apparatus, the deriving unit re-derives the data corresponding to the reference for power loss.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the present disclosure and, together with the description, serve to explain principles of the present disclosure.

FIG. 8A is a diagram illustrating an operation sequence of a second processing example executed by the system.

FIG. 8B is a diagram illustrating an operation sequence of the second processing example executed by the system.

FIG. 9B is a diagram illustrating an operation sequence of the third processing example executed by the system.

FIG. 10 is a diagram illustrating an example of power transmitting antenna (power transmitting coil) information held by the power transmitting apparatus.

FIG. 11 is a diagram for describing a foreign object detection method based on the power loss method.

DESCRIPTION OF THE EMBODIMENTS

Figure 1:
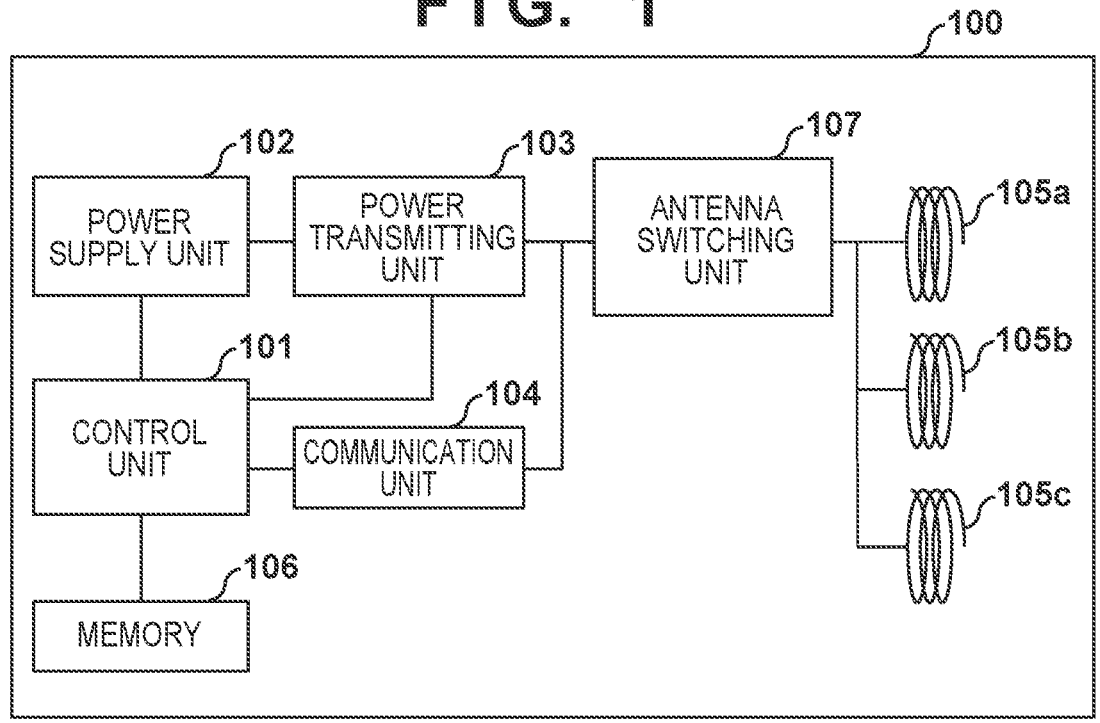
FIG. 1 is a block diagram illustrating an example configuration of a power transmitting apparatus.

Hereinafter, embodiments will be described in detail with reference to the attached drawings. Note, the following embodiments are not intended to limit the scope of the present disclosure. Multiple features are described in the embodiments, but limitation is not made to the present disclosure that requires all such features, and multiple such features may be combined as appropriate. Furthermore, in the attached drawings, the same reference numerals are given to the same or similar configurations, and redundant description thereof is omitted.

Foreign Object Detection Method Based on Power Loss Method

First, a foreign object detection method based on the power loss method specified in the Wireless Power Consortium (WPC) standard will be described using FIG. 11. FIG. 11 is a diagram for describing the foreign object detection method based on the power loss method. In FIG. 11, the transmission power of a power transmitting apparatus is represented on the horizontal axis, and the reception power of a power receiving apparatus is represented on the vertical axis. A foreign object is an object with electrical conductivity such as a metal piece or the like that is not the power receiving apparatus.

First, the power transmitting apparatus transmits power to the power receiving apparatus and receives a reception power value Pr1 (referred to as a Light Load) corresponding to the power received by the power receiving apparatus from the power receiving apparatus. Then, the power transmitting apparatus stores a transmission power value Pt1 of that time (point 1100). Herein, the transmission power value Pt1 is a predetermined minimum transmission power, and the reception power value Pr1 is a predetermined minimum reception power. At this time, the power receiving apparatus controls the load so that the power to be received is the minimum power. For example, the power receiving apparatus may disconnect the load from a power receiving antenna so that the power received is not supplied to the load (charging circuit, battery, or the like). Note that this state may be referred to a Light Load state. At this time, the power transmitting apparatus can recognize that the power loss between the power transmitting apparatus and the power receiving apparatus when Pt1 is transmitted as the transmission power corresponds to Pt1−Pr1 (Ploss1). Next, the power transmitting apparatus receives a value of a reception power value Pr2 (referred to as a Connected Load) corresponding to the power received by the power receiving apparatus. At this time, the power receiving apparatus supplies the power received to the load. Then, the power transmitting apparatus stores a transmission power value Pt2 of that time (point 1101). Herein, the transmission power value Pt2 is a predetermined maximum transmission power, and the reception power value Pr2 is a predetermined maximum reception power. At this time, the power receiving apparatus controls the load so that the power to be received is the maximum power. For example, the power receiving apparatus connects the power receiving antenna and the load so that the power received is supplied to the load. Note that this state may be referred to a Connected Load state. At this time, the power transmitting apparatus can recognize that the power loss between the power transmitting apparatus and the power receiving apparatus when Pt2 is transmitted as the transmission power corresponds to Pt2−Pr2 (Ploss2). Then, the power transmitting apparatus performs linear interpolation using the point 1100 and the point 1101 and generates a straight line 1102. The straight line 1102 indicates the relationship between the transmission power and the reception power in a state where there is no foreign object near the power transmitting apparatus and the power receiving apparatus. In other words, the straight line 1102 may be referred to as data corresponding to the reference for power loss. Accordingly, the reception power in a state where there is no foreign object can be estimated by the power transmitting apparatus from the transmission power value and the straight line 1102. For example, when the transmission power value is Pt3, from a point 1103 on the straight line 1102 indicating the transmission power value is Pt3, the reception power value can estimated to be Pr3.

Herein, in a case where the power transmitting apparatus has transmitted power to the power receiving apparatus using a transmission power of Pt3, the power transmitting apparatus receives a value corresponding to a reception power value Pr3' from the power receiving apparatus. The power transmitting apparatus calculates a value Pr3−Pr3' (=Ploss_FO) obtained by subtracting the reception power value Pr3' corresponding to the actual power received from the power receiving apparatus from the reception power value Pr3 in a state where there is no foreign object. The Ploss_FO can be considered the power loss consumed by the foreign object when there is a foreign object between the power transmitting apparatus and the power receiving apparatus. Thus, when the power Ploss_FO considered to be consumed by the foreign object is equal to or greater than a predetermined threshold, it is determined that "there is a foreign object" or "there is a possibility that there is a foreign object".

Alternatively, the power transmitting apparatus obtains in advance a power loss Pt3−Pr3 (Ploss3) between the power transmitting apparatus and the power receiving apparatus from the reception power value Pr3 in a state where there is no foreign object. Next, a power loss Pt3−Pr3' (Ploss3') between the power transmitting apparatus and the power receiving apparatus in a state where there is a foreign object is obtained from the reception power value Pr3' corresponding to the power received from the power receiving apparatus in a state where there is a foreign object. Also, the power Ploss_FO considered to be consumed by the foreign object may be obtained from Ploss3'−Ploss3 (=Ploss_FO).

As described above, the method of obtaining the power Ploss_FO considered to be consumed by the foreign object may include obtaining Pr3−Pr3' (=Ploss_FO) or may include obtaining Ploss3'−Ploss3 (=Ploss_FO). Hereinafter, in the present specification, basically, the method of obtaining Ploss3'−Ploss3 (=Ploss_FO) is used, but the method of obtaining Pr3−Pr3' (=Ploss_FO) may also be applied. This concludes the description of foreign object detection based on the power loss method.

Overview of Foreign Object Detection Method According to Present Embodiment

Figure 2:
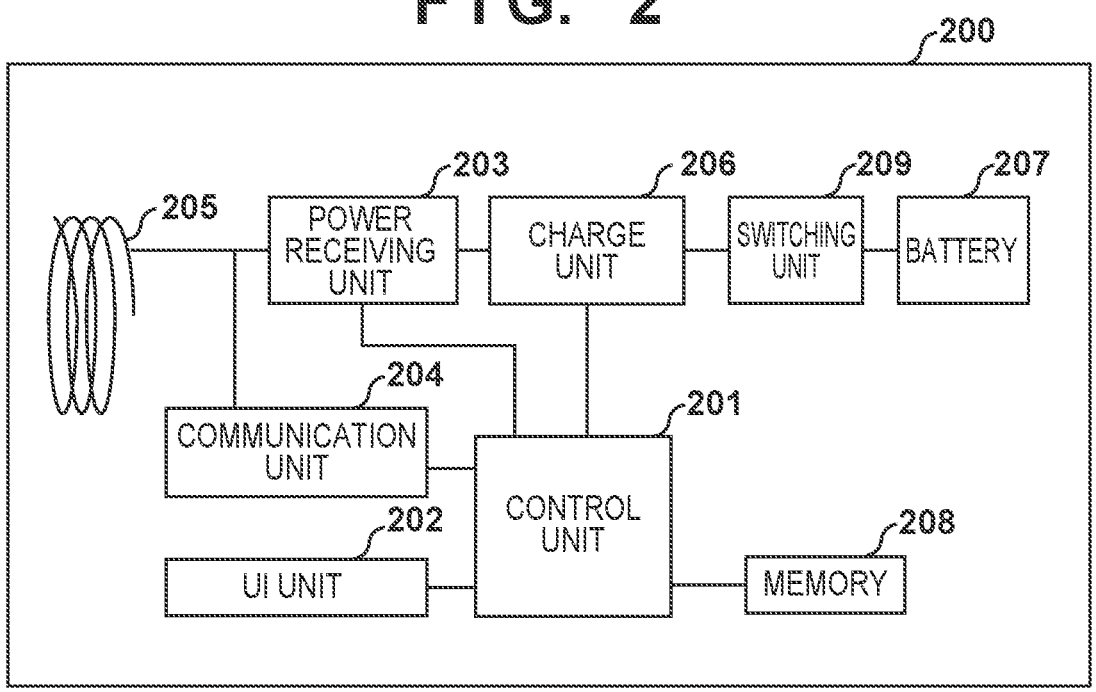
FIG. 2 is a block diagram illustrating an example configuration of a power receiving apparatus.

Next, a foreign object detection method of a power transmitting apparatus capable of transmitting power to a plurality of power receiving apparatus will be described. FIGS. 12A to 12F are diagrams illustrating examples of the configuration of a wireless power transmission system according to the present embodiment. Hereinafter, the power transmitting apparatus will be referred to as TX, and the power receiving apparatus will be referred to as RX. Note that the configurations of TX 100 and RXs 200 to 220 are illustrated in FIGS. 1 and 2 and are described below in detail.

The TX 100 transmits power to the RXs 200, 210, and 220 placed on the TX 100 (for example, on a charging stand (placement surface) disposed near power transmitting antennas 105a, 105b, and 105c) via the power transmitting antennas 105a, 105b, and 105c. The RXs 200, 210, and 220 each receive power transmitted from the TX 100 via a power receiving antenna 205. Note that communication between the TX and the RXs is performed via the power transmitting antenna and the power receiving antenna.

Figure 12A:
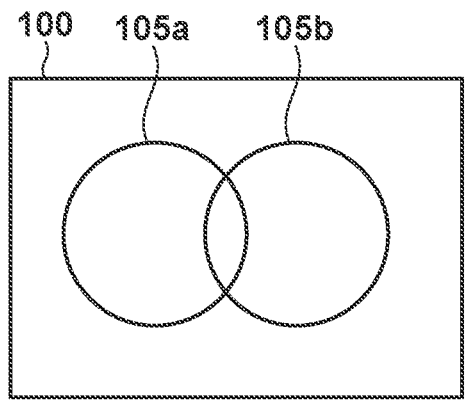
FIG. 12A is a diagram illustrating an example configuration of a wireless power transmission system.
Figure 12B:
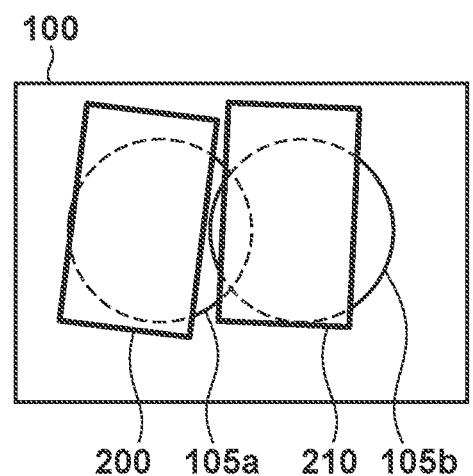
FIG. 12B is a diagram illustrating an example configuration of the wireless power transmission system.
Figure 12C:
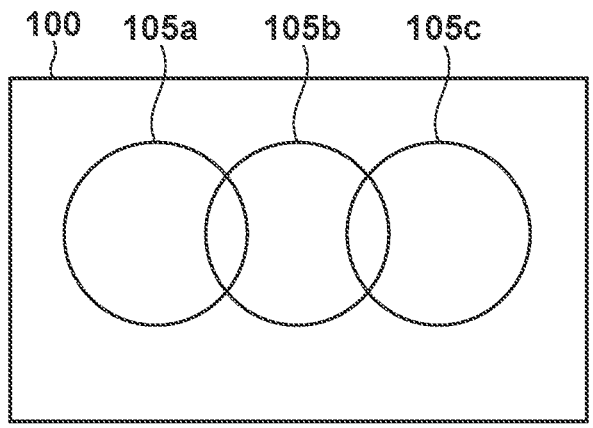
FIG. 12C is a diagram illustrating an example configuration of the wireless power transmission system.
Figure 12D:
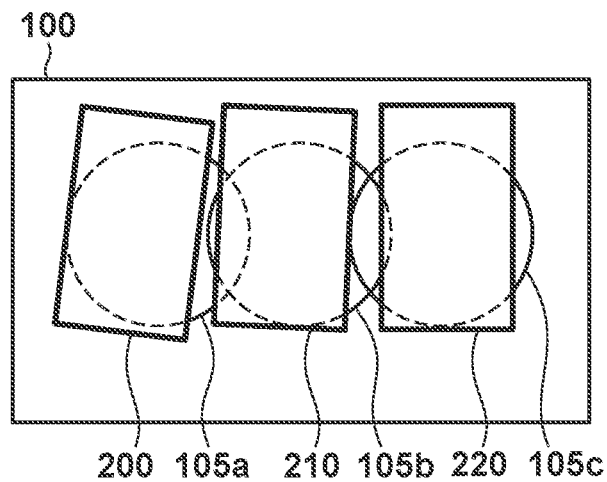
FIG. 12D is a diagram illustrating an example configuration of the wireless power transmission system.
Figure 12E:
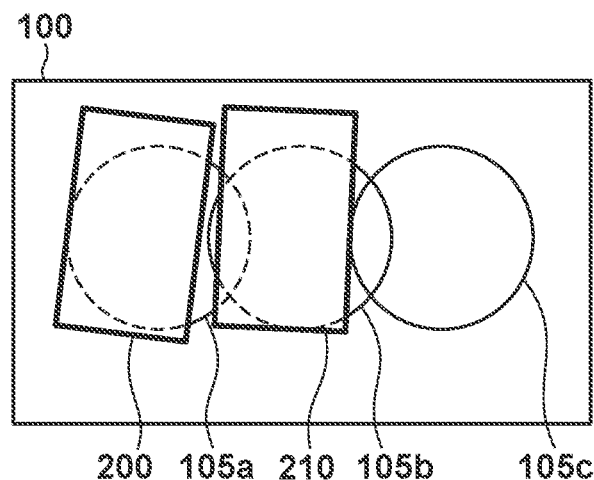
FIG. 12E is a diagram illustrating an example configuration of the wireless power transmission system.
Figure 12F:
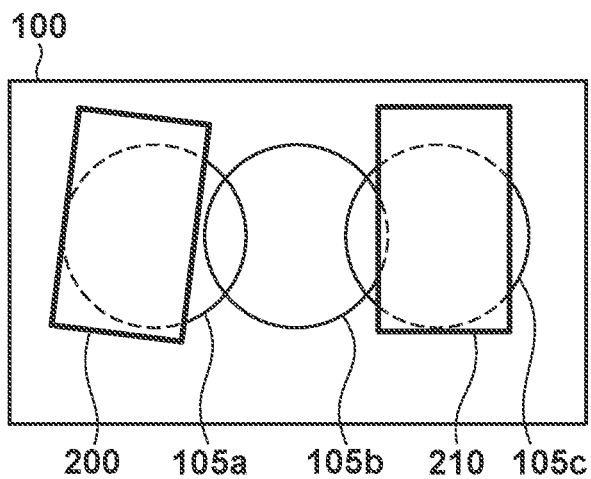
FIG. 12F is a diagram illustrating an example configuration of the wireless power transmission system.

The TX 100 illustrated in FIG. 12A includes power transmitting antennas 105a and 105b and transmits power to the RXs 200 and 210 as illustrated in FIG. 12B. Also, the TX 100 illustrated in FIG. 12C includes the power transmitting antennas 105a to 105c and transmits power to the RXs 200 to RX 220 as illustrated in FIG. 12D and the RX 200 and the RX 210 as illustrated in FIGS. 12E and 12F.

Here, let's look at each TX-RX power loss between the TX and the plurality of RXs. With a TX being capable of transmitting power to (charging) a plurality of RXs (for example, a first RX and a second RX), the power loss between the TX and the first RX and the power loss between the TX and the second RX are different. For example, the TX 100 illustrated in FIG. 12C transmits power to the RX 200 via the power transmitting antenna 105a and the power receiving antenna 205 of the RX 200. Also, the TX 100 illustrated in FIG. 12C transmits power to the RX 210 via the power transmitting antenna 105b and the power receiving antenna 205 of the RX 210. At this time, the power loss between the TX 100 and the RX 200 and the power loss between the TX 100 and the RX 210 is different. There are various reasons for this including the characteristics of the power transmitting antenna, the characteristics of the power receiving antenna, the positional relationship between the TX (power transmitting antenna) and the RX, the effects of the RX 200 on the electrical characteristics of the power transmitting antenna 105b, the effects of the RX 210 on the electrical characteristics of the power transmitting antenna 105a, the state of the circuits inside the RX (for example, the connection state between the power receiving antenna and the load (charging circuit, battery, or the like)), and the like.

Thus, when the first RX and the second RX are placed on the TX, the power loss between the TX and the first RX has a possibility of being affected by the second RX. In a similar manner, there is a possibility that the power loss between the TX and the second RX may be affected by the first RX. Thus, when there is a change in the state (number of devices, placement position, and the like) of the RXs placed on the TX, a change also occurs in straight line indicating the power loss in a state where there is no foreign object between the TX and the RX calculated in advance or the relationship between the transmission power and the reception power as illustrated in FIG. 11, giving rise to the problem of a decrease in foreign object detection accuracy.

To solve this problem, when the TX according to the present embodiment detects a change (a change in the power transmission and reception state in the power-transmittal range of the TX) in the state of the TX or the RX placed on the TX, the TX re-calculates the "power loss between the TX and the RX". Here, an example of "the state of the TX or the RX placed on the TX" includes but is not limited to the number of placed RXs. Other examples include the characteristics of the power transmitting antenna, the characteristics of the power receiving antenna, the positional relationship between the TX (power transmitting antenna) and the RX, the effects of the RX 200 on the electrical characteristics of the power transmitting antenna 105b, the effects of the RX 210 on the electrical characteristics of the power transmitting antenna 105a, and the like. In this manner, when the power loss between the TX and the RX in a state where there is no foreign object is calculated in advance and when the power loss between the TX and the RX during power transmission is calculated, the characteristics of the power transmitting antenna, the characteristics of the power receiving antenna, the positional relationship between the TX (power transmitting antenna) and the RX, the effects of the RX 200 on the electrical characteristics of the power transmitting antenna 105b, the effects of the RX 210 on the electrical characteristics of the power transmitting antenna 105a, the state of the circuits inside the RX (for example, the connection state between the power receiving antenna and the load (charging circuit, battery, or the like)), and the like can be made the same. Thus, foreign object detection can appropriately performed with a wireless power transmission system in which a TX transmits power to a plurality of RXs.

System Configuration

The wireless power transmission system according to the present embodiment illustrated in FIGS. 12A to 12F will now be described in further detail. The TX 100 and the RXs 200, 210, and 220 are compliant with the WPC standard. The RXs 200, 210, and 220 are capable of receives power from the TX 100 and charging a battery. The TX 100 is an electronic device that wirelessly transmits power to the RXs 200, 210, and 220 placed on the TX 100. In the following examples, the RXs 200, 210, and 220 are placed on the TX 100. However, for the TX 100 to transmit power to the RXs 200, 210, and 220, as long as the RXs 200, 210, and 220 are within the power-transmittal range of the TX 100, the RXs 200, 210, and 220 may not be placed on the TX 100.

Also, the RXs 200, 210, and 220 and the TX 100 may have a function of executing an application other than non-contact charging. For example, the RXs 200, 210, and 220 may be smartphones, and an example of the TX 100 is an accessory device for charging the smartphone. The RXs 200, 210, and 220 and the TX 100 may be tablets, storage apparatuses, such as a hard disk device or a memory device, or may be information processing apparatuses, such as a personal computer (PC) or the like. Also, the RXs 200, 210, and 220 and the TX 100, for example, may be image input apparatuses, such as an image capture apparatus (a camera, a video camera, and the like) or a scanner, or may be image output apparatuses, such as a printer, copying machine, or a projector. Also, the TX 100 may be a smartphone. In this case, the RXs 200, 210, and 220 may be another smartphone or a wireless earphone. Also, the TX 100 may be a charger placed on the console or the like inside the vehicle.

In the present system, wireless power transmission is performed using an electromagnetic induction method for non-contact charging on the basis of the WPC standard. In other words, for the RXs 200, 210, and 220 and the TX 100, wireless power transmission is performed between the power receiving antenna 205 of the RXs 200, 210, and 220 and the power transmitting antennas 105a to 105c of the TX 100 to perform non-contact charging based on the WPC standard. Note that the wireless power transmission system (non-contact power transmission method) used in the present system is not limited to that defined in the WPC standard, and other systems may be used, such as other electromagnetic induction systems, magnetic field resonance systems, electric field resonance systems, microwave systems, lasers, and the like. Also, in the present embodiment, the non-contact charging uses wireless power transmission. However, wireless power transmission may be used for a different purpose other than for non-contact charging.

Power transmission control according to the WPC standard will now be described using an example in which the TX is the TX 100 and the RX are the RXs 200, 210, and 220. In the WPC standard, the magnitude of the power guaranteed when power is received by the RXs 200, 210, and 220 from the TX 100 is defined as a value called Guaranteed Power (hereinafter, referred to as GP). GP indicates the power value of the guaranteed output to the load (for example, a circuit for charging, a battery, and the like) of the RXs 200, 210, and 220 even when the power transmitting efficiency between the power receiving antenna and the power transmitting antenna decreases due to the positional relationship between the RXs 200, 210, and 220 and the TX 100 changing, for example. For example, when the GP is 5 watts, even when the positional relationship between the power receiving antenna and the power transmitting antenna changes and the power transmitting efficiency is reduced, the TX 100 controls the power transmission in a manner such that 5 watts is output to the load in the RXs 200, 210, and 220.

Also, per the method specified in the WPC standard, the TX 100 detects the existence of an object (foreign object) that is not an RX near the TX 100 (near the power receiving antenna). The methods specifically specified are a power loss method in which a foreign object is detected using the difference between the transmitted power of the TX 100 and the reception power of the RXs 200, 210, and 220 and a Q-factor measurement method in which a foreign object is detected using the change in the quality coefficient (Q-factor) of the power transmitting antenna (power transmitting coil) of the TX 100. Foreign object detection using the power loss method is performed during transfer of power (power transmission) (in a Power Transfer phase described below). Also, foreign object detection using the Q-factor measurement method is performed before power transmission (in a Negotiation phase or Renegotiation phase described below).

The RXs 200, 210, and 220 and the TX 100 according to the present embodiment communicate to perform power transmission and reception control based on the WPC standard. The WPC standard defines a plurality of phases including a Power Transfer phase in which power is transmitted and one or more phases before actual power transmission. In these phases, communication is executed to control the transmitting and receiving of power as necessary. Pre-power transmission phases may include a Selection phase, a Ping phase, an Identification and Configuration phase, a Negotiation phase, and a Calibration phase. Note that hereinafter, the Identification and Configuration phase will be referred to as the I&C phase.

In the Selection phase, the TX 100 intermittently transmits an Analog Ping and detects if an object is placed on the TX 100 (for example, if the RXs 200, 210, and 220, a conductor piece, or the like is placed on the TX 100). The TX 100 detects at least a voltage value or a current value of a power transmitting antenna when the Analog Ping is transmitted, determines that an object exists in the case in which the voltage value is less than a threshold or the current value is greater than a threshold, and transitions to the Ping phase.

In the Ping phase, the TX 100 transmits a Digital Ping with more power than the Analog Ping. The magnitude of the power of the Digital Ping is sufficient enough to activate a control unit 201 (FIG. 2) of the RXs 200, 210, and 220 placed on the TX 100. The RXs 200, 210, and 220 notify the TX 100 of the magnitude of the received voltage. In this manner, by receiving a reply from the RXs 200, 210, and 220 that received the Digital Ping, the TX 100 recognizes that the objects detected in the selection phase are the RXs 200, 210, and 220. When the TX 100 receives a notification of the received voltage value, the process transitions to the I&C phase.

In the I&C phase, the TX 100 identifies the RXs 200, 210, and 220 and acquires device configuration information (capability information) from the RXs 200, 210, and 220. Accordingly, the RXs 200, 210, and 220 transmit an ID packet and a Configuration Packet to the TX 100. The ID packet includes the identification information of the RXs 200, 210, and 220, and the Configuration Packet includes the device configuration information (capability information) of the RXs 200, 210, and 220. The TX 100 having received the ID packet and the Configuration Packet replies with an acknowledge (ACK, affirmative reply). Then, the I&C phase ends.

In the Negotiation phase, the GP value is determined on the basis of the GP value requested by the RXs 200, 210, and 220, the power transmission capability of the TX 100, and the like. Also, the TX 100 executes foreign object detection processing using the Q-factor measurement method in accordance with the request from the RXs 200, 210, and 220. Also, in the WPC standard, a method is specified in which, after the Power Transfer phase has been transitioned to, a similar processing to the Negotiation phase is again executed at the request of the RX. The phase in which this processing is executed after transitioning from the Power Transfer phase is called the Renegotiation phase.

In the Calibration phase, on the basis of the WPC standard, the RXs 200, 210, and 220 notify the TX 100 of a predetermined reception power value (reception power value in a light load state/reception power value in a high load state), and the TX 100 performs adjustments to efficiently transmit power. The reception power value reported to the TX 100 can be used for foreign object detection processing using the power loss method.

In the Power Transfer phase, control is performed to start power transmission, continue power transmission, stop power transmission due to an error or a full charge, and the like. The TX 100 and the RXs 200, 210, and 220 perform communication using the same power transmitting antenna (power transmitting coil) used for wireless power transmission based on the WPC standard, for controlling the transmitting and receiving of power therebetween and superimposing a signal on the electromagnetic waves transmitted from the power transmitting antenna or the power receiving antenna. Note that the communicable range between the TX 100 and the RXs 200, 210, and 220 based on the WPC standard is roughly the same as the power-transmittal range of the TX 100.

Configuration of Power Transmitting Apparatus and Power Receiving Apparatus

Next, the configuration of a power transmitting apparatus and a power receiving apparatus according to the present embodiment will be described using FIGS. 1 and 2. FIG. 1 is a block diagram illustrating an example configuration of the power transmitting apparatus (TX) 100 according to the present embodiment. Also, FIG. 2 is a block diagram illustrating an example configuration of the power receiving apparatus (RX) 200 according to the present embodiment. Note that the RX 210 and the RX 220 have the same configuration as the RX 200. Note that the configuration described below is simply one example, and a part (or all parts) of the configuration described below may be replaced by other configurations with similar functions, may be omitted, or other configurations may be added in addition to the configurations described below. Furthermore, one block described in the description below may be one block divided into a plurality of blocks or may be a plurality of blocks merged as a single block. Also, for the functional blocks described below, the functions may be configured as software programs. However, a part or all parts included in each functional block may be configured as hardware.

The TX 100 (FIG. 1) will be described first. As illustrated in FIG. 1, the TX 100 includes a control unit 101, a power supply unit 102, a power transmitting unit 103, a communication unit 104, the power transmitting antennas 105a to 105c, a memory 106, and an antenna switching unit 107. The control unit 101, the power supply unit 102, the power transmitting unit 103, the communication unit 104, the memory 106, and the antenna switching unit 107 are illustrated as separate units in FIG. 1. However, from among these, any number of the functional blocks may be mounted on the same chip.

The control unit 101, for example, controls the entire TX 100 by executing a control program stored in the memory 106. Also, the control unit 101 executes control relating to power transmission control including communication for device authentication by the TX 100. Furthermore, the control unit 101 may execute control for executing an application other than wireless power transmission. The control unit 101, for example, includes one or more processors, such as a central processing unit (CPU), a microprocessor unit (MPU), or the like. Note that the control unit 101 may be configured as hardware dedicated to specific processing, such as an application specific integrated circuit (ASIC), or the like. Also, the control unit 101 may include an array circuit such as a field programmable gate array (FPGA) compiled so as to execute predetermined processing. The control unit 101 causes information stored during the execution of various types of processing to be stored in the memory 106. Also, the control unit 101 is capable of measuring time using a timer (not illustrated).

The power supply unit 102 supplies power to each functional block. The power supply unit 102, for example, is a commercial power supply or a battery. Power supplied from a commercial power supply is stored in the battery.

The power transmitting unit 103 converts direct current or alternating current power input from the power supply unit 102 to alternating current frequency power in a frequency band used for wireless power transmission and generates electromagnetic waves for reception by the RX by inputting the alternating current frequency power into the power transmitting antennas 105a to 105c. For example, the power transmitting unit 103 converts DC voltage supplied by the power supply unit 102 to AC voltage at a switching circuit with a half bridge or full bridge configuration using field effect transistors (FETs). In this case, the power transmitting unit 103 includes a gate driver that controls switching the FETs on and off.

Also, the power transmitting unit 103 controls the intensity of the electromagnetic waves output by adjusting either one or both of the voltage (power transmission voltage) and the current (power transmission current) input to the power transmitting antennas 105a to 105c via control by the control unit 101. If power transmission voltage or power transmission current is increased, the intensity of electromagnetic waves is increased, and if power transmission voltage or power transmission current is decreased, the intensity of electromagnetic waves is decreased. In addition, on the basis of an instruction from the control unit 101, the power transmitting unit 103 performs output control of the alternating current frequency power to start or stop power transmission from the power transmitting antennas 105a to 105c. Also, the power transmitting unit 103 has the capability to supply power corresponding to outputting 15 watts (W) of power to a charge unit (in the case of the RXs 200 to 220, a charge unit 206 (FIG. 2)) of the RX according to the WPC standard.

The communication unit 104 performs communication with the RX for power transmission control based on the WPC standard as described above via control by the control unit 101. The communication unit 104 performs communication including modulating the electromagnetic waves output from the power transmitting antennas 105a to 105c and transmitting information to the RX. Also, the communication unit 104 demodulates the electromagnetic waves modulated at the RX outputs from the power transmitting antennas 105a to 105c and obtained the information transmitted by the RX. In other words, communication performed by the communication unit 104 is performed by superimposition of a signal on electromagnetic waves transmitted from the power transmitting antennas 105a to 105c. Also, the communication unit 104 may communicate with the RX via communication using a standard other than the WPC standard using an antenna other than the power transmitting antennas 105a to 105c, or the communication unit 104 may communicate with the RX selectively using a plurality of communications.

The memory 106 may store the control program as well as the state of the TX 100 and the RX (reception power value and the like). For example, the state of the TX 100 may be obtained by the control unit 101, the state of the RX may be obtained by an RX control unit (in the case of the RXs 200 to 220, the control unit 201 (FIG. 2)), and these may be received via the communication unit 104.

The plurality of power transmitting antennas (coils) 105a to 105c are connected to the antenna switching unit 107. The antenna switching unit 107 selects and switches to one or more of the plurality of antennas (coils). Note that in FIG. 1, the three power transmitting antennas 105a to 105c are illustrated. However, the number of power transmitting coils is not limited to this number. Also, hereinafter, the power transmitting antennas 105a to 105c may be referred to as the power transmitting antenna 105.

Next, the RX 200 (FIG. 2) will be described. As described above, the RX 210 and the RX 220 have the same configuration as the RX 200. As illustrated in FIG. 2, the RX 200 includes the control unit 201, a user interface (UI) unit 202, a power receiving unit 203, a communication unit 204, the power receiving antenna 205, a charge unit 206, a battery 207, a memory 208, and a switching unit 209. Note that the plurality of functional blocks illustrated in FIG. 2 may be implemented as a single hardware module.

The control unit 201, for example, controls the entire RX 200 by executing a control program stored in the memory 208. In other words, the control unit 201 controls the functional units illustrated in FIG. 2. Furthermore, the control unit 201 may execute control for executing an application other than wireless power transmission. In one example, the control unit 201 includes one or more processors, such as a CPU, an MPU, or the like. Note that the entire RX 200 (in a case where the RX 200 is a smart phone, the entire smart phone) may be controlled in cooperation with the operating system (OS) executed by the control unit 201.

Also, the control unit 201 may be configured as hardware dedicated to a specific processing such as an ASIC. Also, the control unit 201 may include an array circuit such as an FPGA compiled so as to execute predetermined processing. The control unit 201 causes information stored during the execution of various types of processing to be stored in the memory 208. Also, the control unit 201 is capable of measuring time using a timer (not illustrated).

The UI unit 202 performs various types of output to the user. Herein, outputting in various manners refers to an operation such as screen display, flashing or changing the color of LEDS, audio output via a speaker, vibration of the RX 200 body, and the like. The UI unit 202 is implemented by a liquid crystal panel, a speaker, a vibration motor, or the like.

The power receiving unit 203, at the power receiving antenna 205, obtains AC power (AC voltage and AC current) generated by electromagnetic induction caused by electromagnetic waves emitted from the power transmitting antenna 105 of the TX 100. Also, the power receiving unit 203 converts the AC power to DC or AC power of a predetermined frequency and outputs the power to the charge unit 206 that executes processing to charge the battery 207. In other words, the power receiving unit 203 supplies power to a load in the RX 200. GP as described above is the power guaranteed to be output from the power receiving unit 203. The power receiving unit 203 is capable of supplying power for the charge unit 206 to charge the battery 207 and supplying power corresponding to outputting 15 watts to the charge unit 206. The switching unit 209 is configured to control whether or not the received power is supplied to the battery (load). By connecting the charge unit 206 and the battery 207 via the switching unit 209, the received power is supplied to the battery 207. By disconnecting the connection between the charge unit 206 and the battery 207 via a switch and the switching unit 209, the received power is not supplied to the battery 207. Note that, as illustrated in FIG. 2, the switching unit 209 is disposed between the charge unit 206 and the battery 207, but may be disposed between the power receiving unit 203 and the charge unit 206. In FIG. 2, the switching unit 209 illustrated as a single block. However, alternatively, the switching unit may be implemented as a part of the charge unit 206. The communication unit 204 performs communication for power reception control based on the WPC standard as described above with the communication unit 104 of the TX 100. The communication unit 204 demodulates the electromagnetic waves received from the power receiving antenna 205 and obtains the information transmitted from the TX 100. Also, the communication unit 204 performs communications with the TX 100 by superimposing, on electromagnetic waves, a signal relating to the information to be transmitted to the TX 100 via load modulation of the received electromagnetic waves. Note that, the communication unit 204 may communicate with the TX 100 via communication using a standard other than the WPC standard using an antenna other than the power receiving antenna 205, or the communication unit 204 may communicate with the TX 100 selectively using a plurality of communications.

The memory 208 stores the control program as well as the state of the TX 100 and the RX 200. For example, the state of the RX 200 may be obtained by the control unit 201, the state of the TX 100 may be obtained by the control unit 101 of the TX 100, and these may be received via the communication unit 204.

Functional Configuration of Control Unit of Power Transmitting Apparatus

Figure 3:
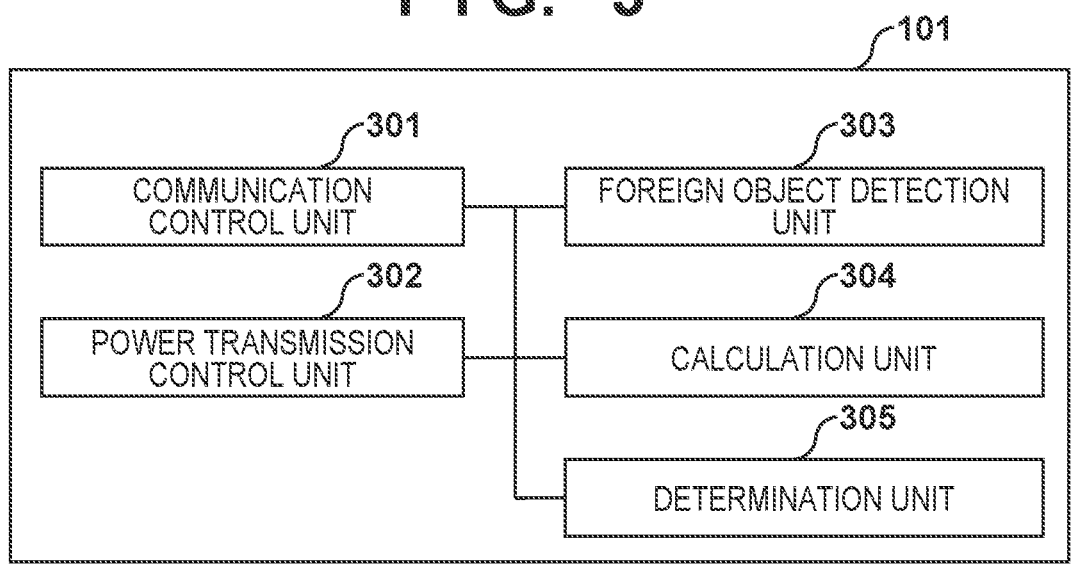
FIG. 3 is a block diagram illustrating an example of the functional configuration of a control unit of the power transmitting apparatus.

Next, the functional configuration of the control unit 101 of the TX (power transmitting apparatus) 100 according to the present embodiment will be described using FIG. 3. FIG. 3 is a block diagram illustrating an example of the functional configuration of the control unit 101. The control unit 101 includes a communication control unit 301, a power transmission control unit 302, a foreign object detection unit 303, a calculation unit 304, and a determination unit 305.

The communication control unit 301 is a processing unit that performs communicate control with the RX based on the WPC standard via the communication unit 104. The power transmission control unit 302 is a processing unit that controls the power transmitting unit 103 and controls transmitting power to the RX. The foreign object detection unit 303 is a processing unit that measures the transmission power at the power transmitting unit 103 and the Q-factor at the power transmitting antenna 105 and detects foreign objects. The foreign object detection unit 303 may implement a foreign object detection function via the power loss method and a foreign object detection function via the Q-factor measurement method. Also, the foreign object detection unit 303 may execute foreign object detection processing using another method. For example, when the TX has a Near Field Communication (NFC) communication function, foreign object detection processing may be executed using an opposing device detection function using an NFC standard. Also, in addition to the function of detecting foreign objects, the foreign object detection unit 303 may also be capable of detecting a change in the state of the TX 100. For example, an increase or decrease in the number of RXs on the TX 100 can be detected. The calculation unit 304 measures the power output to the RX via the power transmitting unit 103 and calculates the average output power value per unit time. The foreign object detection unit 303 executes foreign object detection processing using the power loss method on the basis of the calculation result from the calculation unit 304 and the reception power information received from the RX via the communication control unit 301. The determination unit 305 determines whether to re-derive the Calibration data. Also, the determination unit 305 determines whether the power transmitting antenna transmitting power is a Calibration data re-derivation target antenna. The Calibration data is as described below.

The functions of the communication unit 301, the power transmission control unit 302, the foreign object detection unit 303, the calculation unit 304, and the determination unit 305 are implemented as programs operating via the control unit 101. Each processing unit may be configured as an independent program and operate in parallel with the programs being in sync via event processing or the like.

Flow of Processing by Power Transmitting Apparatus

Figure 4:
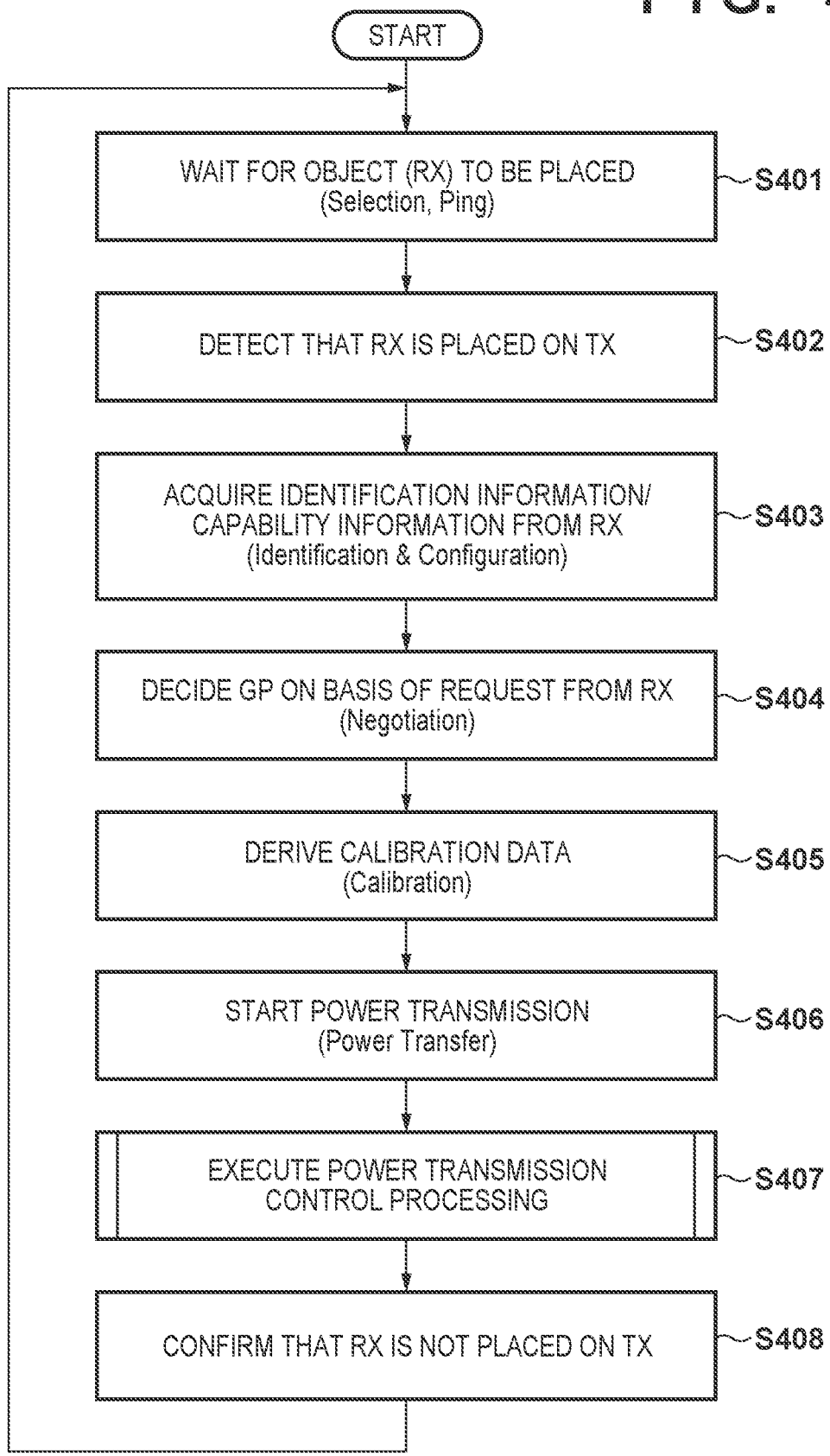
FIG. 4 is a flowchart of the processing executed by the power transmitting apparatus.

Next, the flow of the processing executed by the TX 100 will be described. FIG. 4 is a diagram illustrating a flowchart of the processing executed by the TX 100. The present processing can be implemented by the control unit 101 of the TX 100 executing a program read out from the memory 106, for example. Note that at least a part of the process described below may be implemented by hardware. In the case of implementing processing by hardware, for example, using a predetermined compiler, the processing can be implemented by automatically generating a dedicated circuit that uses a gate array such as an FPGA from a program for implementing each type of processing. Also, the present processing can be executed in response to the power supply of the TX 100 being turned on, in response to the user of the TX 100 inputting a non-contact charging application start instruction, or in response to the TX 100 connecting to a commercial power source and receiving power supply. Also, the present processing may be started by another trigger. Note that the TX 100 executes the present processing using the plurality of power transmitting antennas 105. However, the present processing may be executed successively using one of the power transmitting antennas 105 or may using two or more or all of the power transmitting antennas in parallel.

Note that it is assumed in the examples described hereinafter that one or more RXs are placed on the TX 100 (on the charging stand (placement surface) of the TX 100 configured to close to the plurality of power transmitting antennas), however the RXs may be assumed to be within the power-transmittal range of the TX 100.

First, the communication control unit 301 of the TX 100 executes the processing of the Selection phase and the Ping phase and waits for an object to be placed on the TX 100 (step S401). The foreign object detection unit 303 of the TX 100 detects that a placed object is a RX by communication via the communication control unit 301 (step S402). Here, the foreign object detection unit 303 identifies the power transmitting antenna 105 that detected the RX and acquires information of the identified power transmitting antenna 105 and information of the number of RXs (for example, the number of identified power transmitting antennas 105). The information of the power transmitting antenna may include identification information (an identifier) of the power transmitting antenna and position information of the power transmitting antenna, but it not limited thereto. The communication control unit 301 stores the acquired information in the memory 106.

Next, the I&C phase is transitioned to by the TX 100, and the communication control unit 301 acquires the identification information and the capability information of the RX (step S403). Here, the identification information of the RX may include a WPC standard Manufacturer Code and a Basic Device ID. The capability information of the RX may include information elements for identifying the compatible version of the WPC standard, the maximum power value, which is the value for specifying the maximum power able to be supplied to the load by the RX, information indicating whether or not a negotiation function according to the WPC standard is possessed, and the like. Note that these are examples, and the identification information and the capability information of the RX may be substituted by other information or other information may be included in addition to the information described above. For example, the identification information may be a wireless power ID or other discretionary identification information that allows the individual RX to be identified. Also, the TX 100 may obtain the identification information and the ability information of the RX by a method other than I&C phase communication. The communication control unit 301 stores the acquired identification information and the capability information of the RX in the memory 106.

Next, the Negotiation phase is transitioned to by the communication control unit 301 of the TX 100, and a GP value is decided on the basis of a request to the RX (step S404). Note that in step S404, the GP can be decided using other method without using the communication of the Negotiation phase. Also, when the TX 100 obtains information (in step S403 for example) that the RX does not support the Negotiation phase, the TX 100 may not perform negotiation phase communication and may set the value of the GP as the minimum value (set in advance by the WPC standard, for example).

After the GP decision, the communication control unit 301 of the TX 100 executes the Calibration phase on the basis of the decided GP (step S405). In the Calibration phase, the TX 100 derives the relationship of the reception power in relation to the transmission power in a state where there is no foreign object as described above using FIG. 11. Specifically, the foreign object detection unit 303 of the TX 100, on the basis of the WPC standard, derives (corresponding to the straight line 1102 in FIG. 11) data (power loss data) indicating the power loss between the TX and the RX in a state where there is no foreign object using a predetermined reception power value acquired from RX (including the reception power value in a light load state/Light Load and the reception power value in a maximum load/Connected Load state). Hereinafter, the power loss data is referred to as Calibration data. The Calibration data can be used in the foreign object detection processing using the power loss method to derive data (a threshold) corresponding to a power loss reference. Foreign object detection based on the power loss method is as described above. In other words, when the power loss between the TX and the RX during power transmission calculated using the transmission power value corresponding to the power transmitted by the TX and the reception power value at the RX received during power transmission by the TX is equal to or greater than a predetermined threshold based on the Calibration data, the TX determines that "there is a foreign object" or that "there is a possibility that there is a foreign object".

After the communication control unit 301 of the TX 100 derives the Calibration data, the power transmission control unit 302 starts power transmission (step S406). Power transmission is performed via the processing of the Power Transfer phase. However, no such limitation is intended, and power transmission may be performed via a method other than the WPC standard method. When power transmission starts, the TX 100 executes power transmission control processing (step S407). Power transmission control processing will be described below. When the power transmission control unit 302 of the TX 100 ends the power transmission control processing, the foreign object detection unit 303 confirms that the RX is not placed on the TX 100 (step S408). For example, the foreign object detection unit 303 confirms, via communication via the communication control unit 301, that the RX is not placed on the TX 100 and that there is no power transmitting antenna 105 detecting the RX.

Thereafter, the processing returns to the Selection phase of step S401. Note that when the TX 100 receives an End Power Transfer according to the WPC standard from the RX via the communication control unit 301, the TX 100 ends the processing of all processing phases in accordance with the WPC standard and stops power transmission. Then, the processing returns to step S401. Note that when full charge is reached and an End Power Transfer is transmitted from the RX, the processing also returns to step S401.

Flow of Power Transmission Control Processing (Step S407)

Figure 5A:
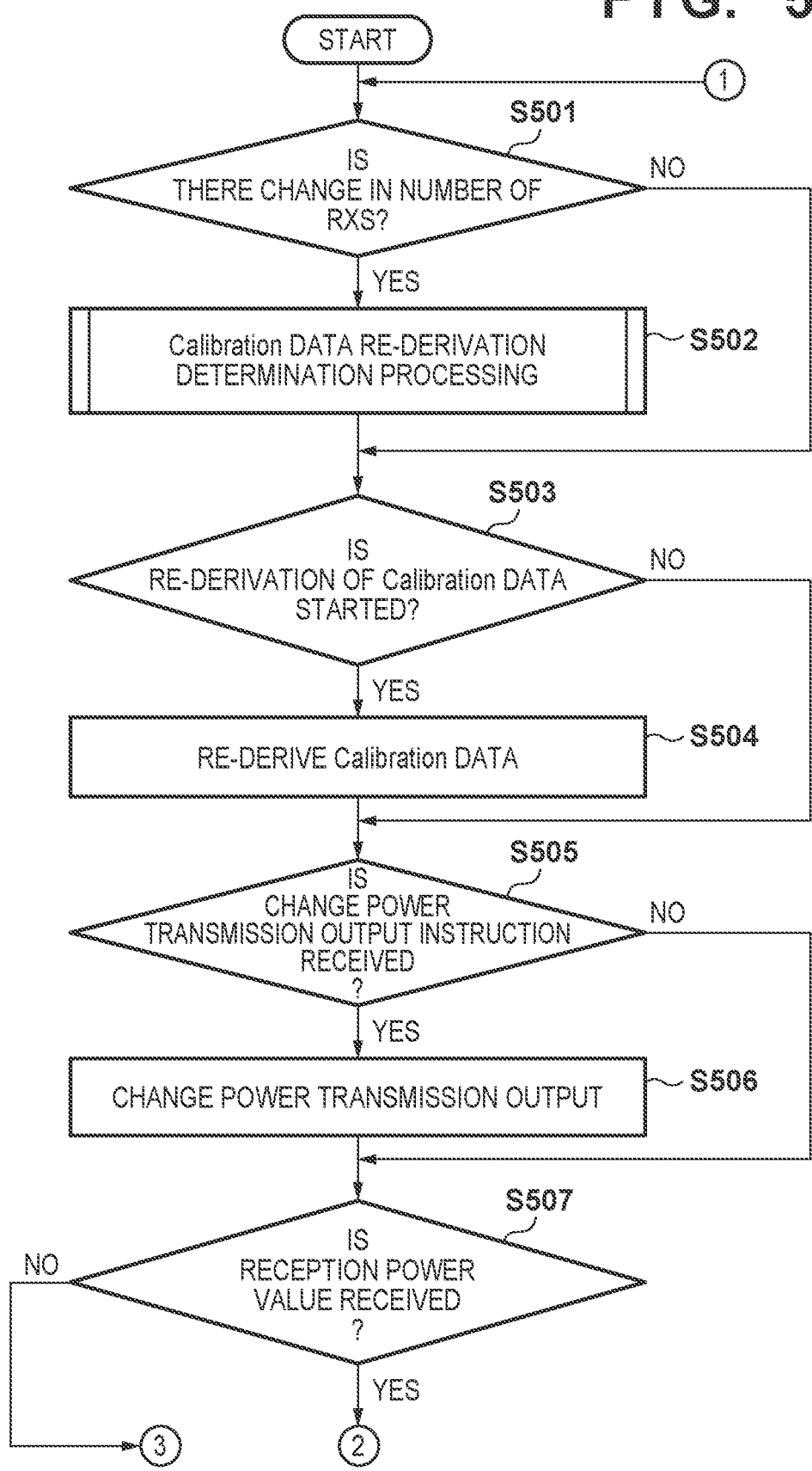
FIG. 5A is a flowchart illustrating an example of power transmission control processing.
Figure 5B:
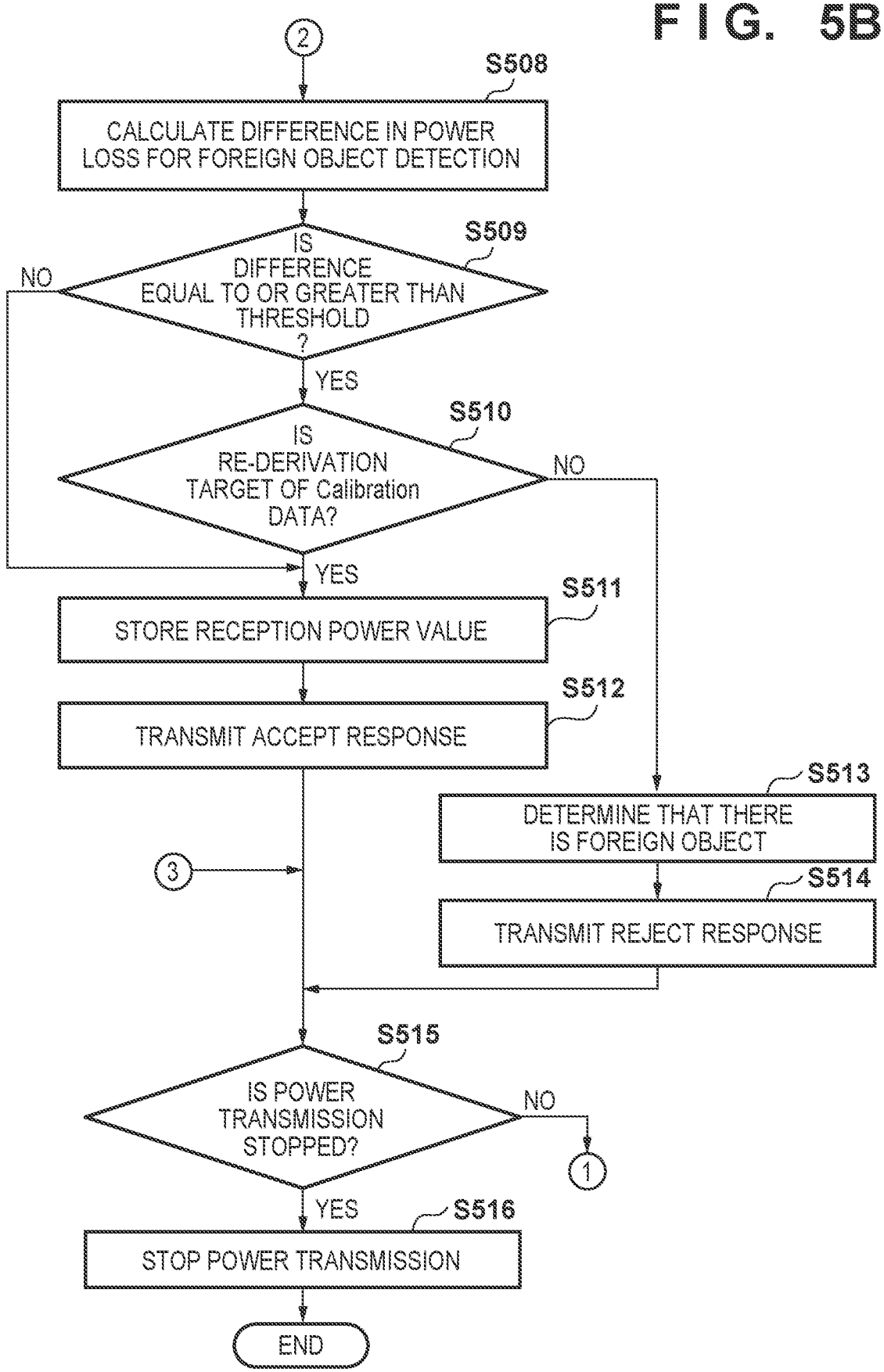
FIG. 5B is a flowchart illustrating an example of power transmission control processing.

Next, an example of the flow of the power transmission control processing executed by the TX 100 in step S407 of FIG. 4 will be described using FIGS. 5A and 5B. FIGS. 5A and 5B are flowcharts illustrating an example of the power transmission control processing. The present processing can be implemented by the control unit 101 of the TX 100 executing a program read out from the memory 106, for example. Note that at least a part of the process described below may be implemented by hardware. In the case of implementing processing by hardware, for example, using a predetermined compiler, the processing can be implemented by automatically generating a dedicated circuit that uses a gate array such as an FPGA from a program for implementing each type of processing.

Hereinafter, the power transmitting antenna performing power transmission in step S406 of FIG. 4 is referred to as the target power transmitting antenna. First, the foreign object detection unit 303 of the TX 100 determines whether or not there is a change in the number of RXs placed on the TX 100 (near the target power transmitting antenna) (step S501). For example, the foreign object detection unit 303 determines whether or not there is a change (an addition or removal of an RX) in the number of RXs placed on the TX 100 on the basis of information relating to the existence or number of RXs placed on the TX 100 acquired in steps S402 and S408. Note that no such limitation is intended, and the foreign object detection unit 303 may make a determination on the basis of the number of RXs executing the processing of the Power Transfer phase, for example. When it is determined that there is a change in the number of RXs (YES in step S501), the processing proceeds to step S502. When it is determined that there is no change in the number of RXs (NO in step S501), the processing proceeds to step S503.

In step S502, the determination unit 305 of the TX 100 determines (Calibration data re-derivation determination processing) whether to re-derive the Calibration data for the target power transmitting antenna. The Calibration data re-derivation determination processing is processing to determine whether or not the Calibration data should be re-derived. In other words, the Calibration data re-derivation determination processing can be said to be processing to determine whether or not to re-derive data corresponding to the reference for power loss used in the power loss method. The Calibration data re-derivation determination processing is described below using FIG. 6.

In step S503, on the basis of the processing of step S502, the determination unit 305 of the TX 100 determines whether or not to start the re-derivation of the Calibration data using the target power transmitting antenna. For example, when the determination unit 305 is notified of a predetermined reception power value (reception power value in a light load state) from the RX via the communication control unit 301, the determination unit 305 determines to start the re-derivation. However, no such limitation is intended. For example, when the determination unit 305 receives a predetermined notification to start the Calibration phase from the RX via the communication control unit 301, the determination unit 305 may determine to start the re-derivation. Also, the determination unit 305 may determine to start the re-derivation in response to a Calibration data re-derivation notification being transmitted to the RX via the communication control unit 301. When it is determined to start the re-derivation of the Calibration data (YES in step S503), the communication control unit 301 derives the Calibration data, or in other words executes the processing of the Calibration phase (step S504), and the processing proceeds to step S505. On the other hand, when it is determined to not start the re-derivation of the Calibration data (NO in step S503), the processing proceeds to step S505.

In step S505, the communication control unit 301 of the TX 100 determines whether or not a change power transmission output instruction has been received. Here, the change power transmission output instruction is performed by including a Control Error Value, which is a value indicating the amount of change in voltage, in a Control Error message according to the WPC standard. When the power transmission output is raised, a positive value is stored in the Control Error Value, when the power transmission output is lowered, a negative value is stored, and when the power transmission output does not change, a zero is stored. When a change power transmission output instruction is received (YES in step S505), the power transmission control unit 302 changes the power transmission output on the basis of the instructed change amount (step S506), and the processing proceeds to step S507. On the other hand, when a change power transmission output instruction is not received (NO in step S505), the power transmission control unit 302 does nothing, and the processing proceeds to step S507.

In step S507, the communication control unit 301 of the TX 100 determines whether or not a reception power value has been received from the RX. Here, a reception power value is a value of the reception power actually received at that point in time at the RX. Note that the reception power value is transmitted and received via a Received Power (mode0) message specified by the WPC standard, but no such limitation is intended. Note that the reception power value may be received over a number of times. When one or more reception power values have been received (YES in step S507), the processing proceeds to step S508. When a reception power value has not been received (NO in step S507), the processing proceeds to step S515.

In step S508, the foreign object detection unit 303 of the TX 100 calculates the difference in the power losses for foreign object detection using the power loss method (the difference between the reception power value in a state where there is no foreign object and the reception power value corresponding to the power received from the RX during power transmission (see the description using FIG. 11)). Then, the foreign object detection unit 303 determines whether or not the difference is equal to or greater than a threshold (step S509). When the power loss difference is equal to or greater than the threshold (YES in step S509), the processing proceeds to step S510. When the power loss difference is less than the threshold (NO in step S509), the processing proceeds to step S511.

In step S510, the determination unit 305 of the TX 100 determines whether or not the target power transmitting antenna is Calibration data re-derivation target antenna, or in other words, whether or not the target power transmitting antenna is an antenna for which is has been determined to re-derive the Calibration data in step S502. When the target power transmitting antenna is a re-derivation target (YES in step S510), the foreign object detection unit 303 stores the power loss calculated in step S508 and the reception power value corresponding to the power received from the RX during power transmission in the memory 106 (step S511). Note that the reception power value corresponding to the power received from the RX acquired in step S508 and stored in step S511 may be a time-averaged value or a median value of a plurality of reception power values received in step S507.

Thereafter, the communication control unit 301 transmits an accept response to the RX (step S512), and the processing proceeds to step S515. On the other hand, when the target power transmitting antenna is not a re-derivation target (NO in step S510), the foreign object detection unit 303 determines that "there is a foreign object" or that "there is a possibility that there is a foreign object" (step S513). Thereafter, the communication control unit 301 transmits a reject response to the RX (step S514), and the processing proceeds to step S515.

In this manner, even when the difference in power losses for foreign object detection using the power loss method is equal to or greater than the threshold, the TX 100 does not determine that "there is a foreign object" or that "there is a possibility that there is a foreign object" when the power transmission target antenna is a Calibration data re-derivation target. Thus, when there is a change in the state on the TX, false detection of a foreign object, in other words, an unnecessary power transmission stoppage or a decrease in the power transmission efficiency, can be suppressed.

Note that when a second threshold different from the threshold described above is provided and the difference between the power losses for foreign object detection is equal to or greater than the second threshold, the foreign object detection unit 303 may determine that "there is a foreign object" or that "there is a possibility that there is a foreign object". For example, by setting the second threshold to a value greater than the maximum power loss difference expected as an effect on the power transmitting antenna adjacent to the power transmission target antenna, if a foreign object enters due to another power receiving apparatus being placed or removed, the foreign object can be detected.

In step S515, the power transmission control unit 302 of the TX 100 determines whether or not to stop power transmission. Here, determining whether or not to stop power transmission is performed by determining whether or not "there is a foreign object" or that "there is a possibility that there is a foreign object" in step S513. However, no such limitation is intended. For example, the power transmission control unit 302 may determine to stop power transmission when an End Power Transfer is received via the communication control unit 301 or may determine to stop power transmission when the power transmission control unit 302 detects a foreign object via the generation of heat in the TX 100 or the like. When the power transmission control unit 302 of the TX 100 determines to stop power transmission (YES in step S515), the power transmission control unit 302 stops power transmission (step S516), and the present processing ends. On the other hand, when the power transmission control unit 302 determines to not stop power transmission, in other words to continue power transmission (NO in step S515), the processing returns to step S501. Note that in step S504, the Calibration data for the target power transmitting antenna may be derived with power being transmitted via another power transmitting antenna. In this manner, Calibration data derivation including the effects of another RX on the electrical characteristics of the power transmission target antenna and the effects of the RX transmitting power on the electrical characteristics of the power transmitting antenna of another RX can be performed.

Note that in another embodiment of the processing of FIGS. 5A and 5B, in step S501, when a change in the power transmission and reception state (the characteristics of the power transmitting antenna, the characteristics of the power receiving antenna, the positional relationship between the TX (power transmitting antenna) and the RX, the effects of another RX on the electrical characteristics of the power transmission target antenna, the effects of the RX transmitting power on the electrical characteristics of the power transmitting antenna of another RX, and the like) in the power-transmittal range of the TX is detected, the processing may proceed to step S502. Also, the processing of steps S502 and S503 may be omitted, and when Yes is true for step S501, the processing may proceed to step S504.

Calibration Data Re-Derivation Determination Processing

Figure 6:
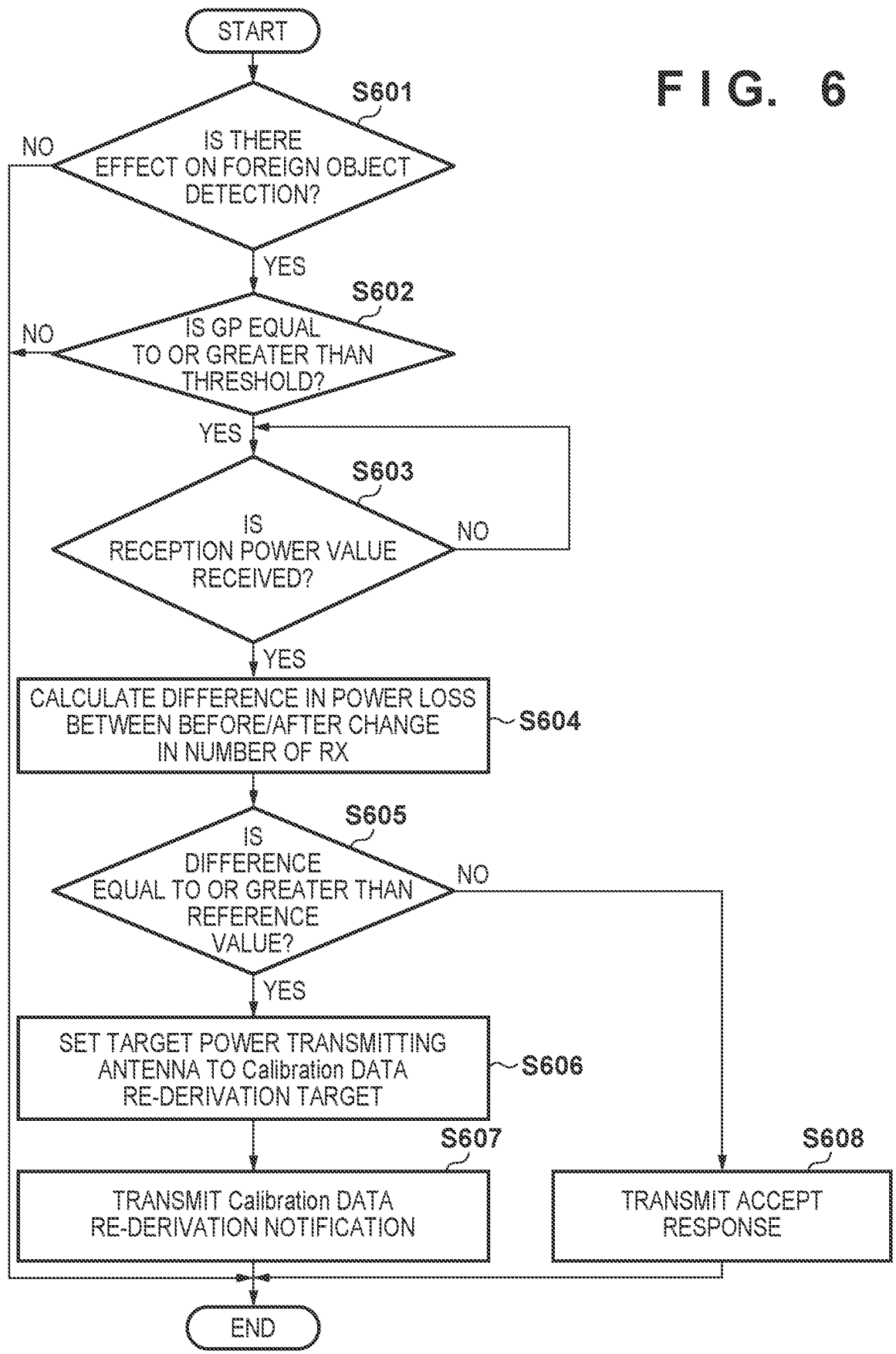
FIG. 6 is a flowchart illustrating an example of Calibration data re-derivation determination processing.

Next, an example of the flow of the Calibration data re-derivation determination processing executed by the TX 100 in step S502 is described using FIG. 6. FIG. 6 is a flowchart illustrating an example of Calibration data re-derivation determination processing. The present processing can be implemented by the control unit 101 of the TX 100 executing a program read out from the memory 106, for example. Note that at least a part of the process described below may be implemented by hardware. In the case of implementing processing by hardware, for example, using a predetermined compiler, the processing can be implemented by automatically generating a dedicated circuit that uses a gate array such as an FPGA from a program for implementing each type of processing.

When the processing starts, the determination unit 305 of the TX 100 determines whether a change in the power transmission and reception state in the power-transmittal range of the TX 100 will affect the foreign object detection of the target power transmitting antenna. For example, the determination unit 305 determines whether or not a power transmitting antenna affected by a change in the number of placed RXs, in other words, another power transmitting antenna that transmits power to a placed/removed RX, affects the foreign object detection of the target power transmitting antenna. This determination may be performed on the basis of power transmitting antenna information held in advance as illustrated in FIG. 10. FIG. 10 is a diagram illustrating an example of power transmitting antenna (power transmitting coil) information held by the TX 100. FIG. 10 illustrates an example of the relationship between the target power transmitting antenna and an adjacent power transmitting antenna when the power transmitting antennas 105a to 105c are arranged as in FIG. 12C. Here, the adjacent power transmitting antenna is determined to affect the foreign object detection of the target power transmitting antenna, however no such limitation is intended. For example, when the position information of each power transmitting antenna is held, the distance between the target power transmitting antenna and another power transmitting antenna that transmits power to another placed/removed RX is calculated, and the distance is within a threshold, the TX 100 may determine that there is an effect.

When the determination unit 305 of the TX 100 determines that there is an effect on the foreign object detection of the processing power transmitting antenna (YES in step S601), the processing proceeds to step S602. When the determination unit 305 determines that there is no effect (NO in step S601), the determination unit 305 determines that it is not necessary to re-derive the Calibration data, and the present processing ends. In step S602, the determination unit 305 of the TX 100 determines whether or not the GP decided for the RX with the target power transmitting antenna is equal to or greater than a threshold. When the GP is equal to or greater than the threshold (YES in step S602), the processing proceeds to step S603. When the GP is less than the threshold (NO in step S602), the determination unit 305 determines that it is not necessary to re-derive the Calibration data, and the present processing ends. Note that whether or not the GP is equal to or greater than the threshold may be determined on the basis of the GP decided with the power transmitting antenna where another RX is placed, but no such limitation is intended.

In step S603, the determination unit 305 of the TX 100 determines whether or not a reception power value has been received via the communication control unit 301. When a reception power value has been received (YES in step S603), the processing proceeds to step S604. When a reception power value has not been received (NO in step S603), the processing of step S603 is repeated until a reception power value is received. Note that the reception power value may be received over a number of times. When one or more reception power values is received from the RX, the determination unit 305 calculates the difference between the reception power value during power transmission acquired in step S508 and stored in step S511 and the reception power value received in step S603 as the difference in power loss during power transmission (step S604). Then, the determination unit 305 determines whether or not the difference is equal to or greater than a reference value (step S605). Accordingly, the determination unit 305 actually measures a before/after change in the power loss when another RX is placed or removed, or in other words, the determination unit 305 can determine whether or not there is an actual effect on the foreign object detection of the target power transmitting antenna.

Note that the two reception power values for obtaining the power loss may be time-averaged values or median values of a plurality of reception power values received in steps S505 and S603. In this manner, even in conditions where there may be some variation in the reception power value due to effects such as the operation state or the placement position of the RX, whether or not the foreign object detection at the target power transmitting antenna is actually affected can be relatively stably determined.

When the power loss difference is equal to or greater than the reference value (YES in step S605), the determination unit 305 sets the target power transmitting antenna as the target for Calibration data re-derivation and stores this in the memory 106 (step S606). Thereafter, the determination unit 305 transmits a Calibration data re-derivation notification to the RX via the communication control unit 301 (step S607), and the present processing ends. Here, the Calibration data re-derivation notification is transmitted with the reason included as a response to a reception power value notification, but no such limitation is intended. For example, the Calibration data re-derivation notification may be individually transmitted as a different message after the response to the reception power value notification is transmitted or may be transmitted as a response to another message received from a power receiving apparatus.

In this manner, when foreign object detection is affected by the placement or removal of the RX or another RX being placed or removed (during power transmission to another RX), by the TX 100 notifying the RX of Calibration data re-derivation, the Calibration data can be reliably re-derived. Thus, false detection of a foreign object, in other words, an unnecessary power transmission stoppage or a decrease in the power transmission efficiency, can be suppressed. On the other hand, when the difference is less than the reference value (NO in step S605), the TX 100 transmits an accept response to the RX (step S608), and with re-derivation of the Calibration data being unnecessary, the present processing ends.

Note that in the processing illustrated in FIG. 6, the steps S601 and S602 may be omitted, making the processing start at step S603.

As described above, when foreign object detection during power transmission is affected by the placement or removal of another RX, by re-deriving the Calibration data, unnecessary power transmission stoppages and decreases in the power transmission efficiency due to false detections of foreign objects can be suppressed. On the other hand, even when another RX is placed or removed, depending on the position and GP of the power transmitting antenna and the actual change in the power loss, it may be determined that there is insignificant or no effect on the foreign object detection during power transmission. In this case, the Calibration data is not re-derived. Accordingly, unnecessary Calibration phase processing such as suppressing the power transmission output to change the reception power value at the RX may be not executed, allowing high-speed power transmission at a relatively high power transmission output to be continued.

Flow of Processing Executed in System

Next, with reference to the processing flow of TX 100 described using FIGS. 4 to 6, some expected situations will be described. Note that in the initial state, the RX is not placed on the TX 100 and the TX 100 has sufficient power transmission capability to perform power transmission at the GP requested by the RX. Also, a threshold with respect to the difference (the difference (see the description of FIG. 11) between the reception power value in a state where there is no foreign object and the reception power value corresponding to the power received from the RX during power transmission) between the reference value for the before/after power loss difference (difference in reception power value) before and after another RX is placed and the power loss for foreign object detection using the power loss method during power transmission is set in advance in the TX 100 as a predetermined value. Note that the reference value and the threshold may be set via an input operation or the like by the user. In the following processing examples, the reference value is 100 mW and the threshold is 750 mW. However, no such limitation is intended. For example, the values may be equal, or the threshold may be set to a value greater than the reference value. Also, hereinafter, the expression "the RX is placed on the power transmitting antennas 105a to 105c of the TX 100" includes in its meaning that the RX is placed on a charging stand (placement surface) in proximity of the power transmitting antennas 105a to 105c and that the RX is disposed at or near (in the power-transmittal range) the power transmitting antennas 105a to 105c.

First Processing Example

First, a first processing example will be described. In the present processing example, as illustrated in FIG. 12C, as a system configuration, the TX 100 includes the power transmitting antennas 105a to 105c. When the TX 100 starts the processing, the RX 200 is placed on the power transmitting antenna 105a of the TX 100, and then after the Calibration data is derived, power transmission is started. Then, after the TX 100 starts power transmission to the RX 200, the RX 210 is placed on the power transmitting antenna 105b of the TX 100. Here, as illustrated in FIG. 12E, the power transmitting antenna 105b where the RX 210 is placed is adjacent to the power transmitting antenna 105a where the RX 200 is placed. Also, since the before/after difference (reception power value difference) in power loss before and after the RX 210 is placed at the power transmitting antenna 105a is equal to or greater than the predetermined reference value, the TX 100 determines that foreign object detection is affected and sets the power transmitting antenna 105a as a target for Calibration data re-derivation. Thereafter, even though the power loss difference for foreign object detection using the power loss method is equal to or greater than the predetermined threshold, since the Calibration data is to be re-derived, the TX 100 does not determine that a foreign object has been detected, and the processing of the Calibration phase is executed again.

Figure 7A:
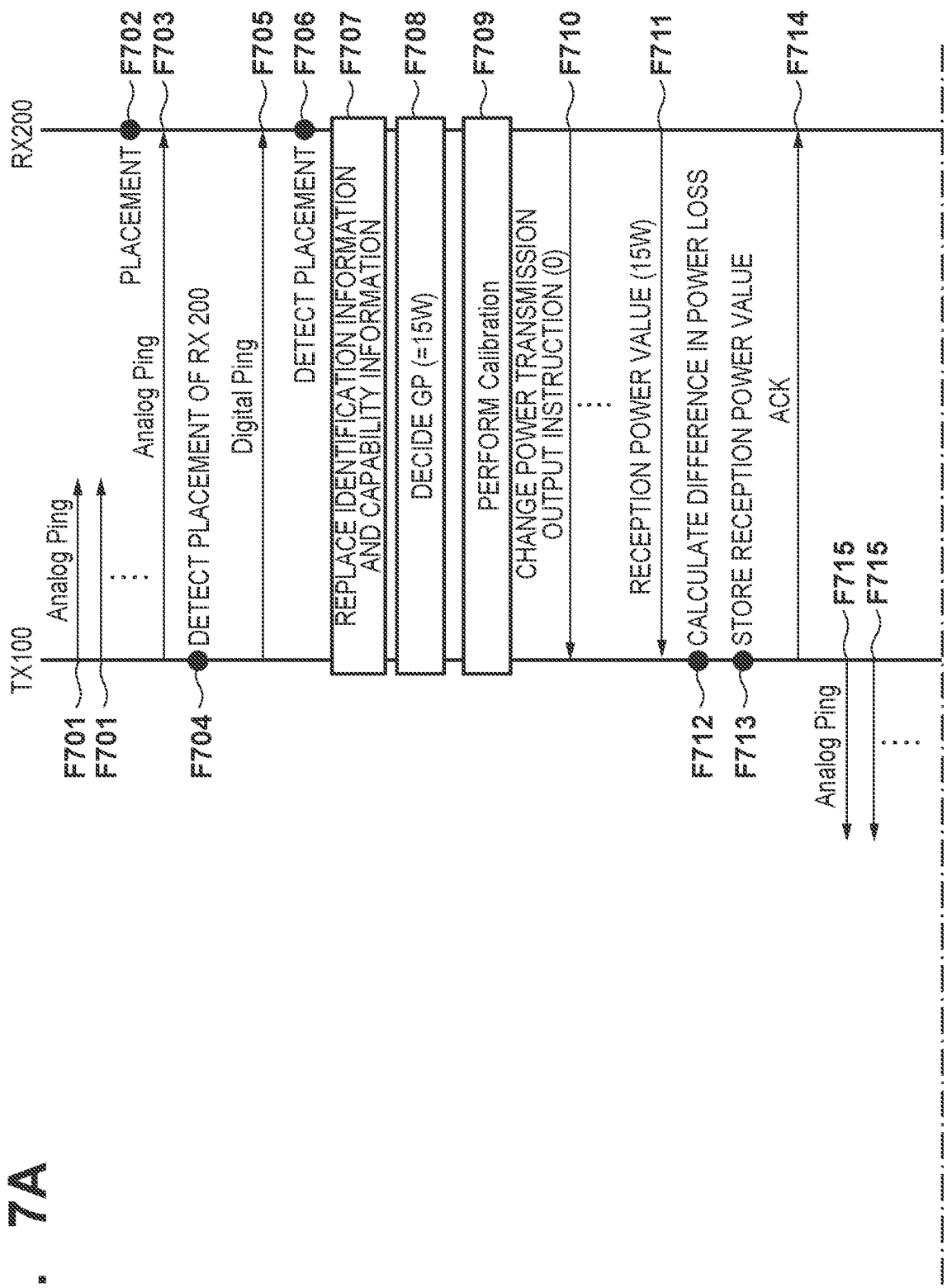
FIG. 7A is a diagram illustrating an operation sequence of a first processing example executed by the system.
Figure 7B:
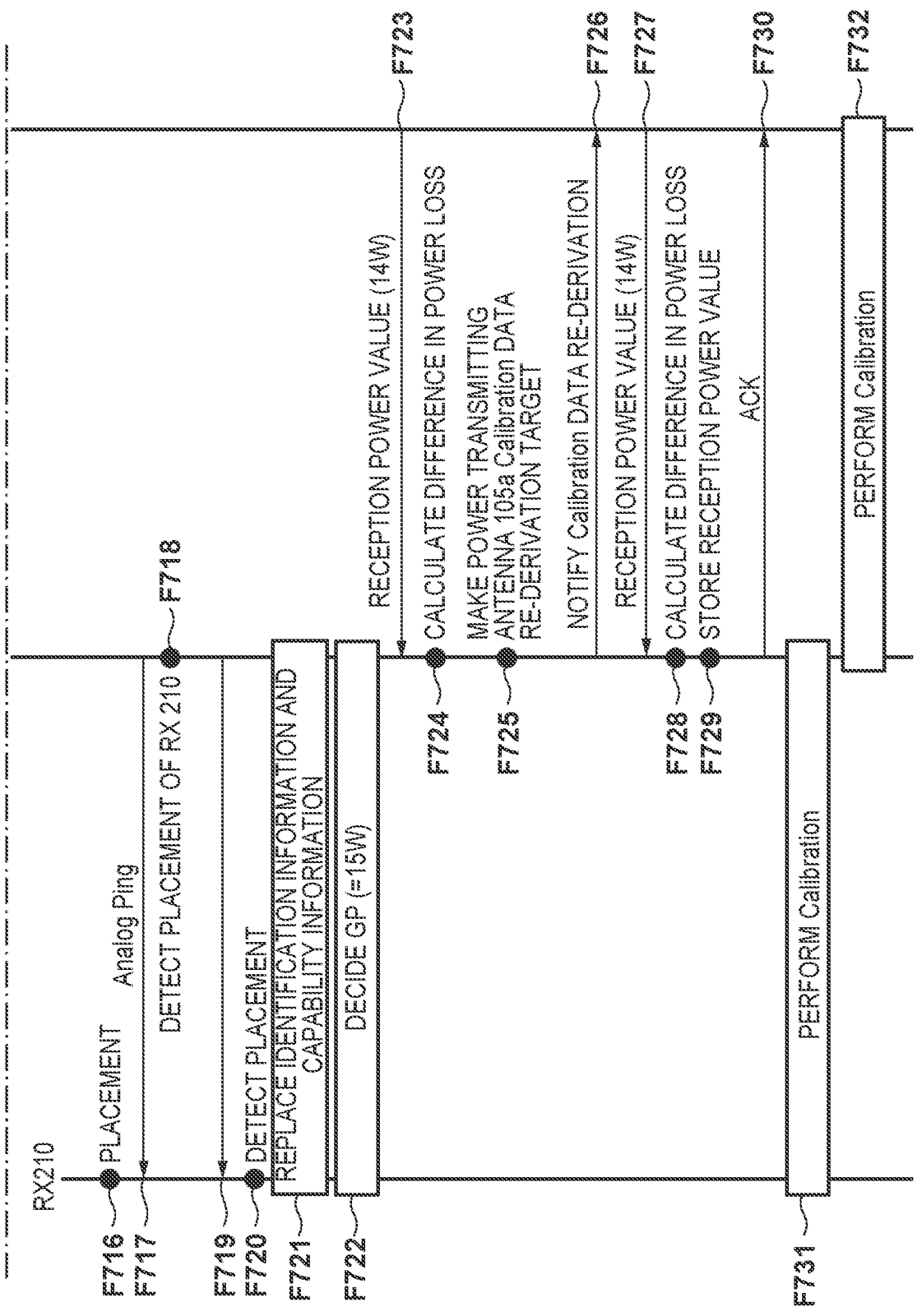
FIG. 7B is a diagram illustrating an operation sequence of the first processing example executed by the system.

FIGS. 7A and 7B are diagrams illustrating the operation sequence of the first processing example. The TX 100 waits for an object to be placed via an Analog Ping at the power transmitting antenna 105a (step S401, F701). When the RX 200 is placed, there is a change in the Analog Ping causing the TX 100 to detect that an object has been placed (F702, F703, F704). The RX 200 detects that it has been placed on the TX 100 (at or near the power transmitting antenna 105a) via a continual Digital Ping (F705, F706). Also, the TX 100 detects that the placed object is the RX (RX 200) via a Digital Ping response (step S402). Next, via I&C phase communication, the TX 100 acquires the identification information and the capability information of the RX 200 (step S403, F707). Next, the TX 100 and the RX 200 perform Negotiation phase communication, and the GP is decided to be equal to 15 W (step S404, F708).

Next, the TX 100 and the RX 200 start Calibration phase communication, and the Calibration data at the power transmitting antenna 105a is derived (step S405). Thereafter, the TX 100 starts power transmission to the RX 200, and power transmission control processing is executed (steps S406 and S407). Here, since there is no change in the number of RXs placed on the other power transmitting antennas 105b and 105c, the Calibration data is not re-derived (NO in step S501, NO in step S503). When the TX 100 receives a change power transmission output instruction instructing the TX 100 to not change the power transmission output from the RX 200, the TX 100 follows the instruction and does not change the power transmission output (YES in step S505, step S506, F710). Next, the TX 100 receives a notification that the reception power value equals 15 W from the RX 200 and calculates the power loss difference for foreign object detection using the power loss method (YES in step S507, step S508, F711, F712). Here, since the power loss difference is less than the threshold without there being a change in the number of placed RXs or a foreign object entering, the TX 100 stores the reception power value and transmits an ACK (NO in step S509, step S511, step S512, F713, F714).

Also, in a similar manner, the TX 100 waits for an object to be placed via an Analog Ping at the power transmitting antenna 105b (step S401, F715). When the RX 210 is placed, there is a change in the Analog Ping causing the TX 100 to detect that an object has been placed (F716, F717, F718). The RX 210 detects that it has been placed on the TX 100 (at or near the power transmitting antenna 105b) via a continual Digital Ping (F719, F720). Also, the TX 100 detects that the placed object is the RX (RX 210) via a Digital Ping response (step S402). Next, via I&C phase communication, the TX 100 acquires the identification information and the capability information of the RX 210 (step S403, F721). Next, the TX 100 and the RX 210 perform Negotiation phase communication, and the GP is decided to be equal to 15 W (step S404, F722).

Next, since there is a change in the number of placed RXs, the TX 100 starts Calibration data re-derivation determination processing with the power transmitting antenna 105a (YES in step S501, step S502). The power transmitting antenna 105b where the RX 210 is placed is adjacent to the power transmitting antenna 105a, and thus the TX 100 determines that foreign object detection is affected (YES in step S601). Next, since the GP decided with the RX 200 is equal to or greater than the threshold, the TX 100 receives a notification that the reception power value equals 14 W from the RX 200 and calculates the before/after power loss difference of before and after the RX 210 is placed (YES in step S602, YES in step S603, step S604, F723, F724). Since the power loss difference (reception power value difference) (=1 W) is equal to or greater than the reference value, the TX 100 determines that foreign object detection is being affected and sets the power transmitting antenna 105a as a target for Calibration data re-derivation (YES in step S605, step S606, F725). Then, the TX 100 transmits a Calibration data re-derivation notification to the RX 200 (step S607, F726). Next, when the TX 100 again receives a notification of the reception power value (=14 W) from the RX 200, the TX 100 calculates the power loss difference for foreign object detection using the power loss method (YES in step S507, step S508, F727, F728). Here, since the power loss difference is equal to or greater than the threshold and the Calibration data is targeted to be re-derived, the TX 100 does not determine there to be a foreign object, stores the reception power value (=14 W), and transmits an ACK (an approval response) (YES in step S509, YES in step S510, step S511, step S512, F729, F730). Thereafter, the TX 100 executes the processing of the Calibration phase for the power transmitting antennas 105a and 105b, and the Calibration data of each is derived (step S405, F731, YES in step S503, step S504, F732).

According to the operations described above, when the RX 210 is placed after the TX 100 has started power transmission to the RX 200, Calibration data is re-derived due to there being an effect on the foreign object detection for power transmission to the RX 200. Also, at this time, when the power loss difference for foreign object detection using the power loss method is greater than a range in which the TX 100 determines there to be no foreign object, the TX 100 does not determine that there is a foreign object. Thus, an unnecessary power transmission stoppage or a decrease in the power transmission efficiency caused by a false detection of a foreign object by the TX 100 can be suppressed.

Second Processing Example

Next, a second processing example will be described. In the present processing example, as illustrated in FIG. 12C, as a system configuration, the TX 100 includes the power transmitting antennas 105a to 105c. When the TX 100 starts the processing, the RX 200 is placed on the power transmitting antenna 105a of the TX 100, and then after the Calibration data is derived, power transmission is started. Then, after the TX 100 starts power transmission to the RX 200, the RX 210 is placed on the power transmitting antenna 105b of the TX 100. Here, as illustrated in FIG. 12F, the power transmitting antenna 105c where the RX 210 is placed is not adjacent to the power transmitting antenna 105a where the RX 200 is placed. Thus, the TX 100 determines that foreign object detection is not affected, does not set the power transmitting antenna 105a as a target for Calibration data re-derivation, and does not execute the processing of the Calibration phase again.

FIGS. 8A and 8B are diagrams illustrating the operation sequence of the second processing example. The processing of F801 to F822 is similar to the processing of F701 to F722 of FIGS. 7A and 7B, and thus description thereof will be omitted. Since there is a change in the number of placed RXs, the TX 100 starts Calibration data re-derivation determination processing (YES in step S501, step S502). Since the power transmitting antenna 105c where the RX 210 is placed is not adjacent to the power transmitting antenna 105a, the TX 100 determines that foreign object detection is not affect and does not set the Calibration data as a target for re-derivation (NO in step S601, F823). Thereafter, the TX 100 receives a notification of the reception power value (=15 W) from the RX 200 and calculates the power loss difference for foreign object detection using the power loss method (YES in step S507, step S508, F824, F825). At this time, since the power loss difference is less than the threshold, the TX 100 determines that there is no foreign object, stores the reception power value (=15 W), and transmits an ACK (NO in step S509, step S511, step S512, F826, F827). Thereafter, the TX 100 executes the processing of the Calibration phase for only the power transmitting antenna 105c, and the Calibration data is derived (step S405, F828).

According to the operations described above, when the RX 210 is placed after the TX 100 has started power transmission to the RX 200, the TX 100 determines, from the position of the power transmitting antenna 105a and the power transmitting antenna 105c, that the power transmission to the RX 200 is not affected and does not re-derive the Calibration data. Accordingly, with the TX 100, unnecessary Calibration phase processing such as suppressing the power transmission output to change the reception power value at the RX 200 may be not executed, allowing high-speed power transmission at a relatively high power transmission output to be continued.

Third Processing Example

Next, a third processing example will be described. In the present processing example, as illustrated in FIG. 12C, as a system configuration, the TX 100 includes the power transmitting antennas 105a to 105c. When the TX 100 starts the processing, the RX 200 is placed on the power transmitting antenna 105a of the TX 100, and then after the Calibration data is derived, power transmission is started. Then, after the TX 100 starts power transmission to the RX 200, the RX 210 is placed on the power transmitting antenna 105b of the TX 100. Here, as illustrated in FIG. 12E, the power transmitting antenna 105b where the RX 210 is placed is adjacent to the power transmitting antenna 105a where the RX 200 is placed. However, since the before/after difference (reception power value difference) in power loss before and after the RX 210 is placed at the power transmitting antenna 105a is less than the predetermined reference value, the TX 100 determines that foreign object detection is not affected, does not set the power transmitting antenna 105a as a target for Calibration data re-derivation, and does not execute the processing of the Calibration phase again.

Figure 9A:
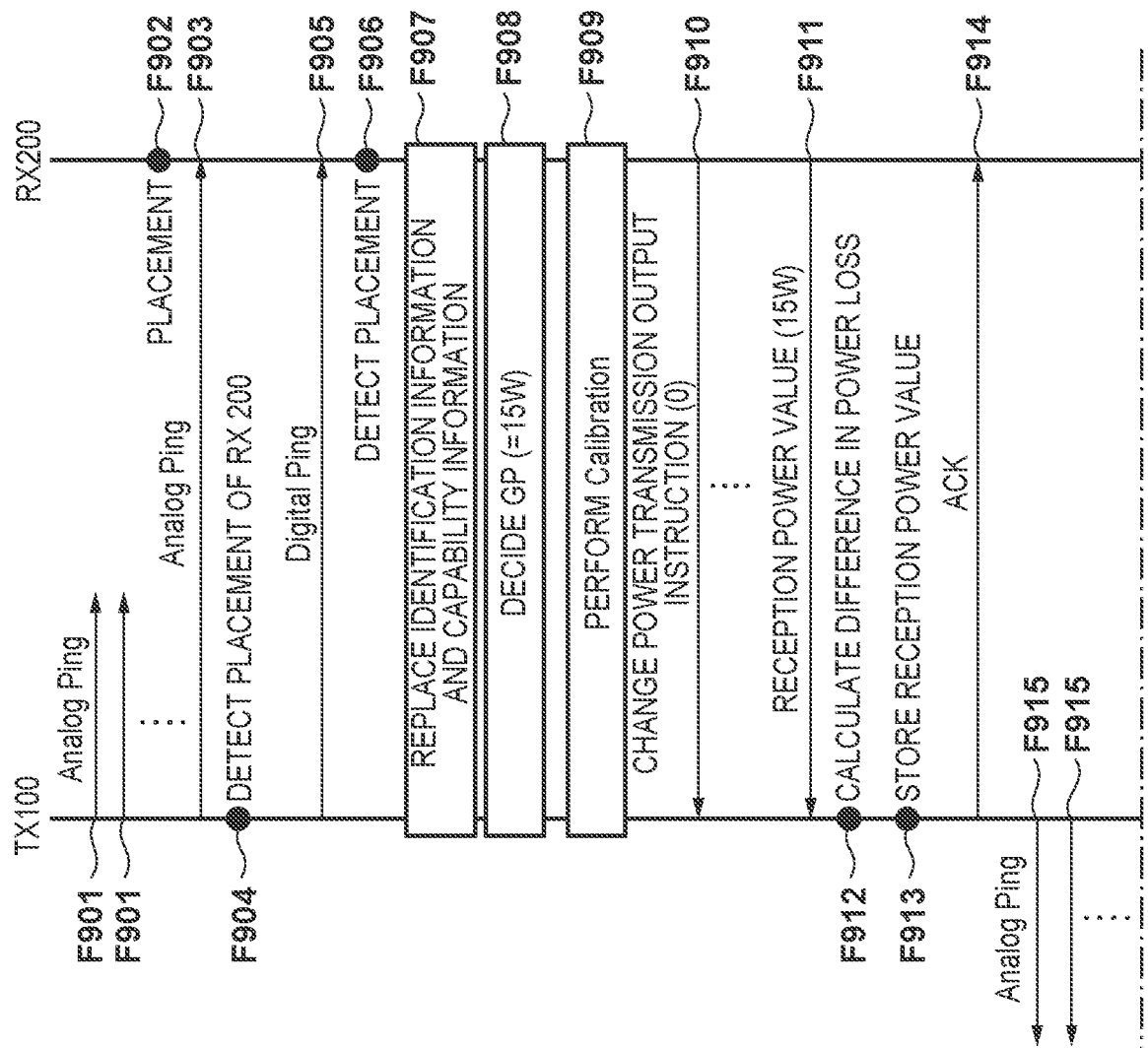
FIG. 9A is a diagram illustrating an operation sequence of a third processing example executed by the system.

FIGS. 9A and 9B are diagrams illustrating the operation sequence of the third processing example. The processing of F901 to F922 is similar to the processing of F701 to F722 of FIGS. 7A and 7B, and thus description thereof will be omitted. Since there is a change in the number of placed RXs, the TX 100 starts Calibration data re-derivation determination processing (YES in step S501, step S502). The power transmitting antenna 105b where the RX 210 is placed is adjacent to the power transmitting antenna 105a, and thus the TX 100 determines that foreign object detection is affected (YES in step S601). Thereafter, since the GP decided with the RX 200 is equal to or greater than the threshold, the TX 100 receives a notification of the reception power value (=15 W) from the RX 200 and calculates the before/after power loss difference (reception power value difference) of before and after the RX 210 is placed (step S603, step S604, F823, F824). Since the difference is less than the reference value, the TX 100 determines that foreign object detection is not being affected, does not set the power transmitting antenna 105a as a target for Calibration data re-derivation, and transmits an ACK (YES in step S605, step S606, step S607, F825, F826). Thereafter, the TX 100 receives a notification of the reception power value (=15 W) from the RX 200 again and calculates the power loss difference for foreign object detection using the power loss method (YES in step S507, step S508, F827, F828). At this time, since the power loss difference is equal to or less than the threshold, the TX 100 determines that there is no foreign object, stores the reception power value (=15 W), and transmits an ACK (NO in step S509, step S511, step S512, F829, F830). Thereafter, the TX 100 executes the processing of the Calibration phase for only the power transmitting antenna 105b, and the Calibration data is derived (step S405, F931).

According to the operations described above, when the RX 210 is placed after the TX 100 has started power transmission to the RX 200, the TX 100 can determine, from the power loss difference before/after placement (reception power value difference) that the power transmission to the RX 200 is not affected. Thus, the Calibration data is not re-derived. Accordingly, with the TX 100, unnecessary Calibration phase processing such as suppressing the power transmission output to change the reception power value at the RX 200 may be not executed, allowing high-speed power transmission at a relatively high power transmission output to be continued.

In this manner, according to the embodiment described above, when there is a change in the state (number of apparatuses or the like) of the power receiving apparatus placed on the power transmitting apparatus, the power loss in a state where there is no foreign object between the power transmitting apparatus and the power receiving apparatus is calculated again. This allows the foreign object detection accuracy during power transmission processing to be improved.

Other Embodiments

In the embodiment described above, the TX is capable of inputting power into all of the power transmitting antennas from one power transmitting unit. However, the TX may include a plurality of power transmitting units, and each power transmitting coil group into which the power transmitting units can input power may be different. At this time, the determination of whether or not to re-derive the Calibration data may be determined by which power transmitting unit can input power into the power transmitting antenna where the RX is placed or removed. For example, when the power transmitting antenna where the RX is placed or removed can be inputted with power from a power transmitting unit during power transmission to another RX, it is determined that the foreign object detection for the power transmission to the other RX is affected and that the Calibration data is to be re-derived. On the other hand, when power from a power transmitting unit during power transmission to another RX cannot be input, it is determined that the foreign object detection for the power transmission to the other RX is not affected and that the Calibration data is to not be re-derived and the like. Also, in addition to which power transmitting unit can input power into the power transmitting antenna where the RX is placed or removed, whether or not to re-derive the Calibration data may be determined on the basis of whether or not the position relative to the power transmitting antenna transmitting power to another RX is adjacent. However, no such limitation is intended. In this manner, even with a TX including a plurality of power transmitting units, whether or not to re-derive the Calibration data can be appropriately determined, and thus the foreign object detection accuracy during power transmission processing can be improved.

In the embodiment described above, the determination of whether or not to re-derive the Calibration data is triggered when there is a change in the number of placed RXs (an addition or removal of another RX). However, another trigger may be used. For example, power transmission at another RX may be stopped or the like when a full charge is reached or a foreign object is detected. Accordingly, even when there is no change in the number of placed RXs, by taking into account the effects of an RX with stopped power transmission on the electrical characteristics of the power transmitting antenna of another RX, the foreign object detection accuracy during power transmission processing can be improved.

In the embodiment described above, the determination of whether or not there is an effect on the foreign object detection in the power transmission to another RX on the basis of a power loss difference is performed by determining whether or not the position of the power transmitting antenna transmitting power to another RX is adjacent to the power transmitting antenna where the RX is placed or removed. However, no such limitation is intended. For example, whether or not the power transmitting antenna where the RX is placed or removed and the power transmitting antenna transmitting power to another RX are physically overlapping may be determined or the like. At this time, if the two are overlapping, there is a high probability of the electrical characteristics of the power transmitting antenna transmitting power to another RX being affected, in other words, there is a high probability of foreign object detection being affected. Thus, a determination based on the power loss difference is not performed, and the Calibration data is re-derived. Thus, an unnecessary power transmission stoppage or a decrease in the power transmission efficiency caused by a false detection of a foreign object by the TX can be more quickly suppressed.

In the embodiment described above, when the power transmitting antenna where the RX is placed or removed is adjacent to the power transmitting antenna transmitting power to another RX, whether or not to re-derive the Calibration data is determined on the basis of the power loss difference. However, the power loss tends to be affects by heat generation and the like, and the possibility of a false determined where it is determined that the foreign object detection is not affected when actually the foreign object detection is affected cannot be discounted. Thus, a value other than the power loss may be used in the determination. For example, the determination may be performed on the basis of whether or not a Q-factor (hereinafter, referred to as a second Q-factor) difference in a time domain representing the attenuation state of a transmission power waveform before and after the RX is placed is less than a predetermined reference value. In this manner, whether or not there is an effect can be more accurately determined, and by calculating the power loss in a state where there is no foreign object between the power transmitting apparatus and the power receiving apparatus again, the foreign object detection accuracy during power transmission processing can be improved. Also, both the power loss and the second Q-factor may be used in the determination. For example, when it is determined that there is no effect via a determination based on the power loss difference, a determination based on the second Q-factor difference may be performed. Also, the determination based on the second Q-factor may be performed before the determination based on the power loss, but no such limitation is intended. In this manner, by using a plurality of values in combination, whether or not there foreign object detection is affected can be determined with a higher probability than when using only one value in the determination.

The second Q-factor may be represented by the formula below. In a transmission power waveform represented by time and voltage, A1 is the voltage value at time T1 and A2 is the voltage value at time T2. F is the frequency f of a high frequency voltage.

$$Q=\pi f(T2-T1)/ln(A1/A2) \tag{Formula 1}$$

The second Q-factor may be acquired from a value of the gradient of a straight line obtained from (A1−A2)/(T2−T1). Alternatively, if the observation time is fixed, the before/after second Q-factors before and after the RX is placed may be compared by comparing (A1−A2) representing the voltage value difference or the values of the voltage value ratio (A1/A2). If the voltage value A1 when power transmission is performed is constant, a comparison of the voltage value A2 after a predetermined amount of time has elapsed may be used. Alternatively, a comparison of the value of the time (T2−T1) until the voltage value A1 reaches a predetermined voltage value A2 may be used. Also, the second Q-factor may be acquired on the basis of a transmission power waveform represented by time and current.

In the embodiment described above, the power transmitting apparatus has a configuration in which one power transmitting antenna selected from a plurality of power transmitting antennas is connected to one power transmitting unit. However, a configuration may be used in which a plurality of power transmitting units are connected to one power transmitting antenna. In other words, in a configuration in which the power transmitting apparatus includes a first power transmitting unit (power transmitting circuit) and a second power transmitting unit (power transmitting circuit) and a first power transmitting antenna and the second power transmitting antenna, either the first power transmitting unit or the second power transmitting unit can connect to the first power transmitting antenna. Let's consider a case in which the first power transmitting unit (power transmitting circuit) is connected to the first power transmitting antenna and power is transmitted to the power receiving apparatus, but the power transmitting unit (power transmitting circuit) connected to the first power transmitting antenna switches from the first power transmitting unit (power transmitting circuit) to the second power transmitting unit (power transmitting circuit). When the electrical characteristics of the first power transmitting unit and the second power transmitting unit are the same, there is no change to the Calibration data described above, and thus power can be transmitted to the power receiving apparatus from the second power transmitting unit (power transmitting circuit) via the methods described in the embodiment described above using the Calibration data already acquired. However, when the first power transmitting unit and the second power transmitting unit has different electrical characteristics, the Calibration data described above also changes, and thus power cannot be transmitted using the Calibration data already acquired. Thus, with the methods described in the embodiment described above, the Calibration data can be derived (acquired) again and used in the power transmission from the second power transmitting unit (power transmitting circuit) to the power receiving apparatus. Note that at this time, the power transmitting apparatus associates together the information of the power transmission target RX, the information of the power transmitting antenna used for power transmission, and the information of the power transmitting unit (power transmitting circuit) used for power transmission and stores them in the memory.

Power can be appropriately transmitted from a power transmitting apparatus to a power receiving apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

The invention claimed is:

1. A power transmitting apparatus comprising:
   a power transmitting unit configured to transmit power wirelessly to one or more power receiving apparatuses;
   a communicating unit configured to communicate with the one or more power receiving apparatuses;
   a deriving unit configured to derive data corresponding to a reference for power loss between the power transmitting apparatus and a power receiving apparatus on a basis of a value of reception power received from the power receiving apparatus via the communicating unit;
   an object detecting unit configured to detect an object different from the power receiving apparatus performing communication on a basis of the data corresponding to the reference for power loss; and
   a detecting unit configured to detect a change in a power transmission and reception state in a power-transmittal range of the power transmitting apparatus, wherein
   when a change in the power transmission and reception state is detected by the detecting unit during power transmission by the power transmitting unit to the power receiving apparatus, the deriving unit re-derives the data corresponding to the reference for power loss,
   wherein, during power transmission by the power transmitting unit to the power receiving apparatus, in a case where a change in the power transmission and reception state detected by the detecting unit is a change in a number of power receiving apparatuses in the power-transmittal range, the deriving unit re-derives the data corresponding to the reference for power loss.

2. The power transmitting apparatus according to claim 1, wherein, during power transmission by the power transmitting unit to the power receiving apparatus, in a case where an addition of an other power receiving apparatus in the power-transmittal range is detected by the detecting unit, the deriving unit re-derives the data corresponding to the reference for power loss.

3. The power transmitting apparatus according to claim 1, wherein, during power transmission by the power transmitting unit to the power receiving apparatus and an other power receiving apparatus, in a case where a removal of the other power receiving apparatus from the power-transmittal range is detected by the detecting unit, the deriving unit re-derives the data corresponding to the reference for power loss.

4. The power transmitting apparatus according to claim 1, wherein the power transmitting apparatus is compliant with a Wireless Power Consortium standard.

5. A power transmitting apparatus comprising:
   a power transmitting unit configured to transmit power wirelessly to one or more power receiving apparatuses;
   a communicating unit configured to communicate with the one or more power receiving apparatuses;
   a deriving unit configured to derive data corresponding to a reference for power loss between the power transmitting apparatus and a power receiving apparatus on a basis of a value of reception power received from the power receiving apparatus via the communicating unit;
   an object detecting unit configured to detect an object different from the power receiving apparatus performing communication on a basis of the data corresponding to the reference for power loss;
   a detecting unit configured to detect a change in a power transmission and reception state in a power-transmittal range of the power transmitting apparatus, wherein
   when a change in the power transmission and reception state is detected by the detecting unit during power transmission by the power transmitting unit to the power receiving apparatus, the deriving unit re-derives the data corresponding to the reference for power loss; and
   a determining unit configured to determine, in a case where a change in the power transmission and reception state is detected by the detecting unit during power transmission by the power transmitting unit to the power receiving apparatus, whether to re-derive the data corresponding to the reference for power loss on the basis of the change in the power transmission and reception state, wherein in a case where the determining unit determines to re-derive the data corresponding to the reference for power loss, the deriving unit re-derives the data corresponding to the reference for power loss.

6. The power transmitting apparatus according to claim 5, further comprising a first calculating unit configured to calculate, in a case where an addition of an other power receiving apparatus in the power-transmittal range is detected by the detecting unit as the change in the power transmission and reception state during power transmission by the power transmitting unit to the power receiving apparatus, a difference between values of reception power at the power receiving apparatus before and after the addition of the other power receiving apparatus is detected with respect to a predetermined transmission power from the power transmitting unit via the communicating unit, wherein in a case where the difference is equal to or greater than a predetermined threshold, the determining unit determines to re-derive the data corresponding to the reference for power loss.

7. The power transmitting apparatus according to claim 6, wherein at least one of the values of reception power at the power receiving apparatus before and after the addition of the other power receiving apparatus is detected indicates a time-averaged value or a median value of a plurality of reception power values.

8. The power transmitting apparatus according to claim 6, wherein, in a case where the difference is equal to or greater than the predetermined threshold, the communicating unit transmits a notification indicating re-derivation of the data corresponding to the reference for power loss to the power receiving apparatus.

9. The power transmitting apparatus according to claim 6, further comprising:

a plurality of antennas for wirelessly transmitting power to a power receiving apparatus; and a second calculating unit configured to calculate a distance between, from among the plurality of antennas, a first power transmitting antenna transmitting power to the power receiving apparatus and a second power transmitting antenna transmitting power to the other power receiving apparatus, wherein in a case where the distance is within a predetermined threshold, the first calculating unit calculates the difference.

10. The power transmitting apparatus according to claim 6, wherein, in a case where a value of reception power guaranteed for the power receiving apparatus decided on in advance between the power transmitting apparatus and the power receiving apparatus is equal to or greater than a predetermined value, the first calculating unit calculates the difference.

11. The power transmitting apparatus according to claim 6, wherein, in a case where the determining unit determines to re-derive the data corresponding to the reference for power loss, the deriving unit derives the data corresponding to the reference for power loss before the object detecting unit performs detection of the object.

12. A control method for a power transmitting apparatus comprising:

transmitting power wirelessly to one or more power receiving apparatuses;

communicating with the one or more power receiving apparatuses;

deriving data corresponding to a reference for power loss between the power transmitting apparatus and a power receiving apparatus on a basis of a value of reception power received from the power receiving apparatus via the communicating;

object detecting an object different from the power receiving apparatus performing communication on a basis of the data corresponding to the reference for power loss;

detecting a change in a power transmission and reception state in a power-transmittal range of the power transmitting apparatus; and re-deriving the data corresponding to the reference for power loss in a case where a change in the power transmission and reception state is detected in the detecting during power transmission to the power receiving apparatus in the transmitting, wherein, during power transmission to the power receiving apparatus, in a case where a change in the power transmission and reception state detected in the detecting is a change in a number of power receiving apparatuses in the power-transmittal range, the data corresponding to the reference for power loss is re-derived in the re-deriving.

13. A non-transitory computer-readable storage medium storing a program for causing a computer to execute a control method for a power transmitting apparatus comprising:

transmitting power wirelessly to one or more power receiving apparatuses;

communicating with the one or more power receiving apparatuses;

deriving data corresponding to a reference for power loss between the power transmitting apparatus and a power receiving apparatus on a basis of a value of reception power received from the power receiving apparatus via the communicating;

object detecting an object different from the power receiving apparatus performing communication on a basis of the data corresponding to the reference for power loss;

detecting a change in a power transmission and reception state in a power-transmittal range of the power transmitting apparatus; and re-deriving the data corresponding to the reference for power loss in a case where a change in the power transmission and reception state is detected in the detecting during power transmission to the power receiving apparatus in the transmitting, wherein, during power transmission to the power receiving apparatus, in a case where a change in the power transmission and reception state detected in the detecting is a change in a number of power receiving apparatuses in the power-transmittal range, the data corresponding to the reference for power loss is re-derived in the re-deriving.

\* \* \* \* \*